(12) United States Patent
El-Refaie et al.

(10) Patent No.: US 12,095,324 B2
(45) Date of Patent: Sep. 17, 2024

(54) STATOR WINDING WITH INTEGRATED COOLING

(71) Applicant: Marquette University, Milwaukee, WI (US)

(72) Inventors: Ayman Mohamed Fawzi El-Refaie, Pewaukee, WI (US); Fan Wu, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 172 days.

(21) Appl. No.: 17/702,575

(22) Filed: Mar. 23, 2022

(65) Prior Publication Data

US 2022/0320933 A1 Oct. 6, 2022

Related U.S. Application Data

(63) Continuation-in-part of application No. PCT/US2020/052642, filed on Sep. 25, 2020.
(Continued)

(51) Int. Cl.
*H02K 3/24* (2006.01)
*H02K 3/28* (2006.01)
(Continued)

(52) U.S. Cl.
CPC .............. *H02K 3/24* (2013.01); *H02K 3/28* (2013.01); *H02K 3/48* (2013.01); *H02K 15/0407* (2013.01)

(58) Field of Classification Search
CPC .. H02K 3/24; H02K 3/28; H02K 3/48; H02K 15/0407; H02K 3/18; H02K 9/19;
(Continued)

(56) References Cited

U.S. PATENT DOCUMENTS

| 4,543,503 A | 9/1985 | Kaminski et al. |
| 4,907,339 A | 3/1990 | Alexandrov |

(Continued)

FOREIGN PATENT DOCUMENTS

| DE | 102018202172 A1 | 8/2019 | |
| EP | 1560313 A2 * | 8/2005 | ............... H02K 3/14 |

(Continued)

OTHER PUBLICATIONS

Aoki, H. et al., Ultra Thin Heat Pipe and Its Application, Frontiers in Heat Pipes (FHP), 2011, 2:043003, pp. 1-5.
(Continued)

*Primary Examiner* — Mohamad A Musleh
(74) *Attorney, Agent, or Firm* — Quarles & Brady LLP

(57) ABSTRACT

A stator winding includes a plurality of conductors including ducts. The ducts can be connected to a heat pipe or a conduit providing a coolant flow to directly cool the winding. The heat pipe can be connected to a heat exchanger that includes a coolant flow. The stator winding can be produced using additive manufacturing, with hollow ducts extending through leg sections and solid end sections. The heat exchanger can also be additively manufactured. A circuit for driving an electrical machine can be in thermal communication with the heat exchanger, such that the thermal system manages both the stators and the drive circuit.

20 Claims, 20 Drawing Sheets

Related U.S. Application Data

(60) Provisional application No. 63/068,764, filed on Aug. 21, 2020, provisional application No. 62/907,138, filed on Sep. 27, 2019.

(51) Int. Cl.
*H02K 3/48* (2006.01)
*H02K 15/04* (2006.01)

(58) Field of Classification Search
CPC ........ H02K 9/225; H02K 9/227; H02K 1/148; H02K 3/22; B33Y 80/00
See application file for complete search history.

(56) References Cited

U.S. PATENT DOCUMENTS

| | | | |
|---|---|---|---|
| 2004/0046475 | A1 | 3/2004 | Holzheu et al. |
| 2012/0256502 | A1* | 10/2012 | Le Besnerais ......... H02K 9/225 310/54 |
| 2014/0033514 | A1 | 2/2014 | Chamberlin et al. |
| 2014/0139057 | A1 | 5/2014 | Ho et al. |
| 2014/0284038 | A1 | 9/2014 | Vedula et al. |
| 2018/0301244 | A1 | 10/2018 | Calebrese et al. |
| 2018/0323683 | A1* | 11/2018 | Stieger ..................... H02K 3/24 |
| 2018/0323689 | A1 | 11/2018 | Schuler et al. |
| 2019/0148037 | A1 | 5/2019 | Leach et al. |

FOREIGN PATENT DOCUMENTS

| | | | |
|---|---|---|---|
| GB | 748826 A | 5/1956 | |
| JP | S5535900 U | 3/1980 | |
| JP | H07307226 A | * 11/1995 | |
| WO | WO-2013014031 A1 | * 1/2013 | ......... H01F 27/2876 |

OTHER PUBLICATIONS

Deshpande, A. et al., Design of a High Efficiency, High Specific-Power Three-Level T-Type Power Electronics Building Block for Aircraft Electric-Propulsion Drives, IEEE Journal of Emerging and Selected Topics in Power Electronics, 2019, 8(1):407-416.

El-Refaie, A., Integrated Electrical Machines and Drives: An Overview, In 2015 IEEE International Electric Machines & Drives Conference (IEMDC), 2015, pp. 350-356.

El-Refaie, A., High Specific Power Electrical Machines: A System Perspective, CES Transactions on Electrical Machines and Systems, 2019, 3(1):88-93.

El-Refaie, A., Role of Advanced Materials in Electrical Machines, CES Transactions on Electrical Machines and Systems, 2019, 3(2): 124-132.

Jahns, T. et al., The Past, Present, and Future of Power Electronics Integration Technology in Motor Drives, CPSS Transactions on Power Electronics and Applications, 2017, 2(3): 197-216.

McGarry, C. et al., Optimisation of Additively Manufactured Permanent Magnets for Wind Turbine Generators, In 2019 IEEE International Electric Machines & Drives Conference (IEMDC), 2019, pp. 656-663.

Melecio, J. et al., 3D-Printed Rapid Prototype Rigs for Surface Mounted PM Rotor Controlled Segment Magnetisation and Assembly, IEEE International Conference on Electric Machines and Drives (IEMDC), 2019, pp. 1-7.

Modeer, T. et al., Design of a GaN-based Interleaved 9-level Flying Capacitor Multilevel Inverter for Electric Aircraft Applications, IEEE Transactions on Power Electronics, 2020, 35(11): 12153-12165.

Pan, D. et al., Control of MW-Scale High-Frequency "SiC+Si" Multilevel ANPC Inverter in Pump-Back Test for Aircraft Hybrid-Electric Propulsion Applications, IEEE Journal of Emerging and Selected Topics in Power Electronics, 2021, 9(1): 1002-1012.

Reddy, P. et al., Comparison of Interior and Surface PM Machines Equipped With Fractional-Slot Concentrated Windings for Hybrid Traction Applications, IEEE Transactions on Energy Conversion, 2012, 27(3):593-602.

Shea, A. et al., Hardware Integration for an Integrated Modular Motor Drive Including Distributed Control, IEEE Energy Conversion Congress and Exposition (ECCE), 2014, pp. 4881-4887.

Simpson, N. et al., Additive Manufacturing of Shaped Profile Windings for Minimal AC Loss in Electrical Machines, IEEE Transactions on Industry Applications, 2020, 56(3):2510-2519.

Technical University of Chemnitz, 3D Multi-Material Printing, Copyright 2023 Chemnitz University of Technology, Johannes Rudolph, Mar. 20, 2018, 1 page.

U.S. Drive, Electrical and Electronics Technical Team Roadmap, Oct. 2017, 41 pages.

Vialva, T., TRUMPF Introduces Precious Metal and Copper 3D Printing Powered by Green Laser, In 3D Printing Industry, Nov. 20, 2018, 1 page.

Wu, F. et al., Toward Fully Additively-Manufactured Permanent Magnet Synchronous Machines: Opportunities and Challenges, IEEE International Electrical Machines & Drives Conference, 2019, 23 pages.

PCT International Search Report and Written Opinion, PCT/US2020/052642, Jan. 25, 2021, 10 pages.

European Patent Office, Extended Search Report, Application No. 20867253.5, Sep. 11, 2023, 12 pages.

* cited by examiner

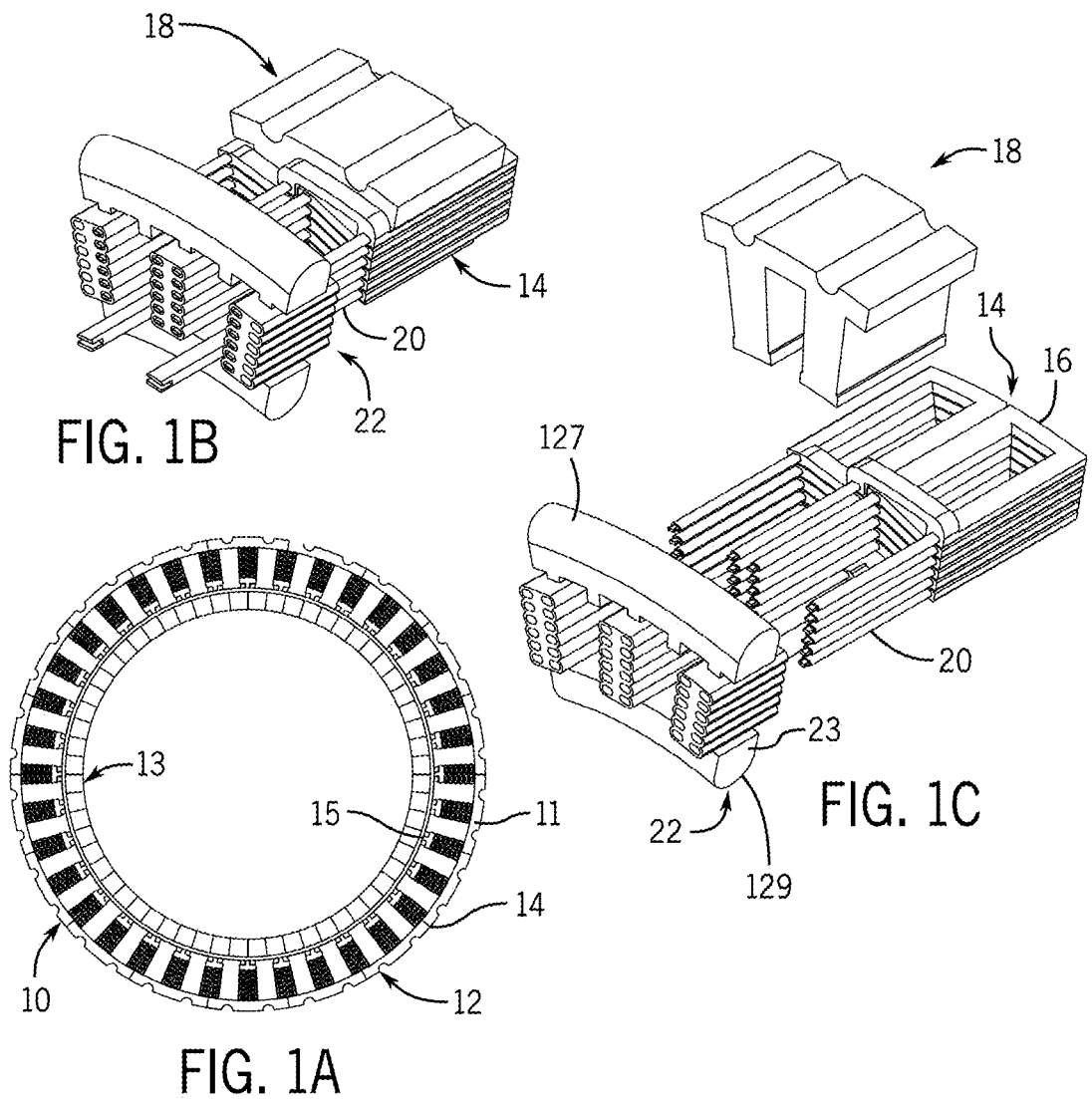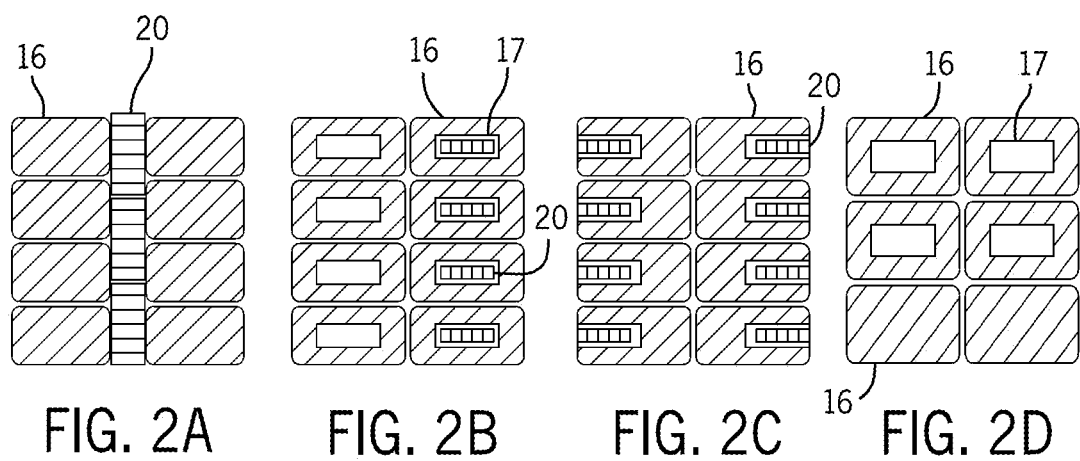

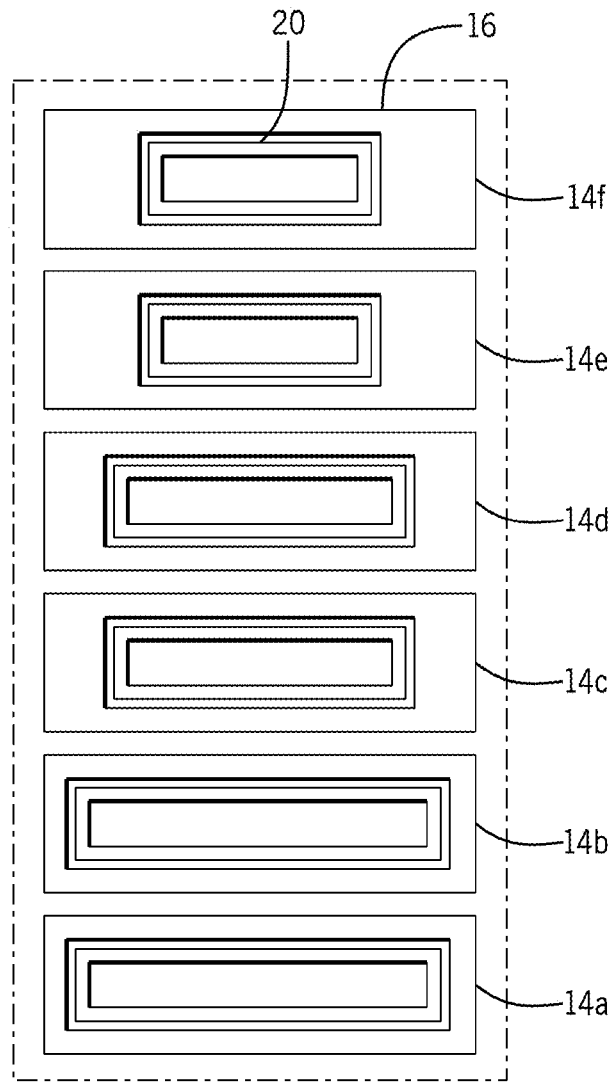

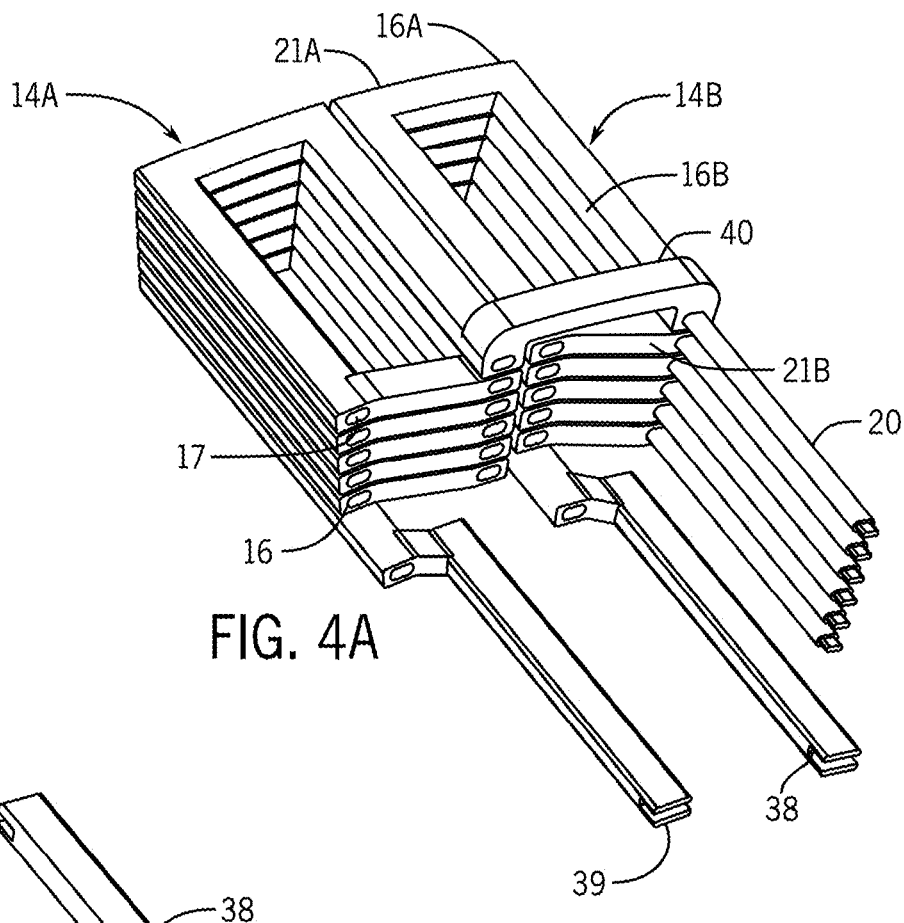
FIG. 4A
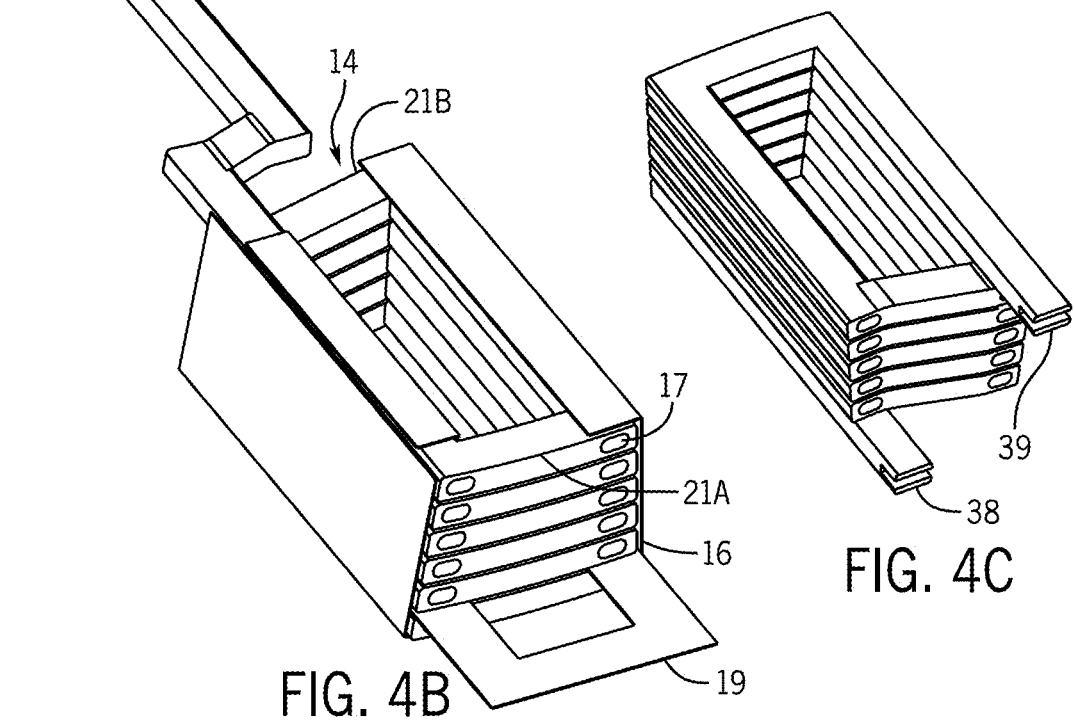
FIG. 4B
FIG. 4C

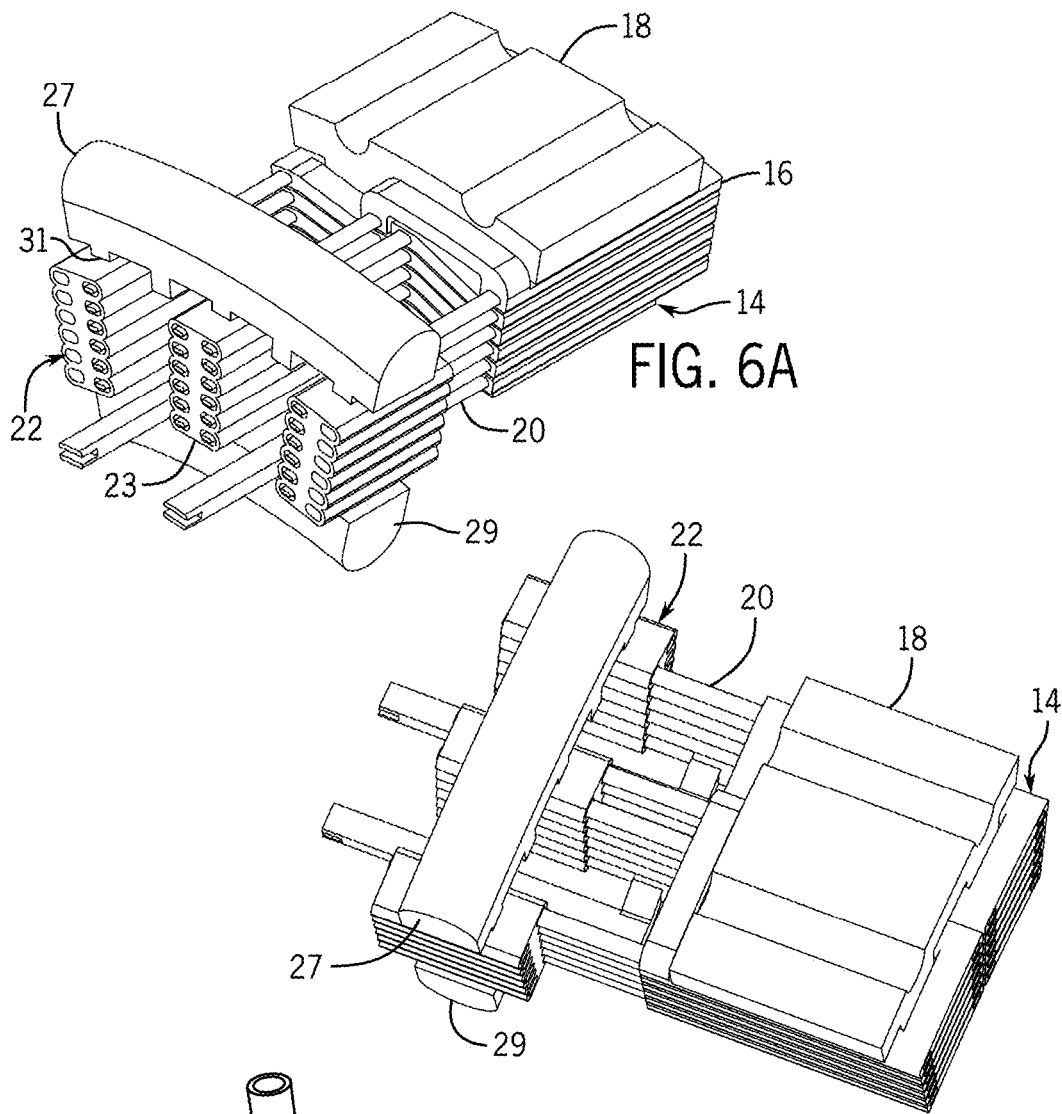
FIG. 6A
FIG. 6B
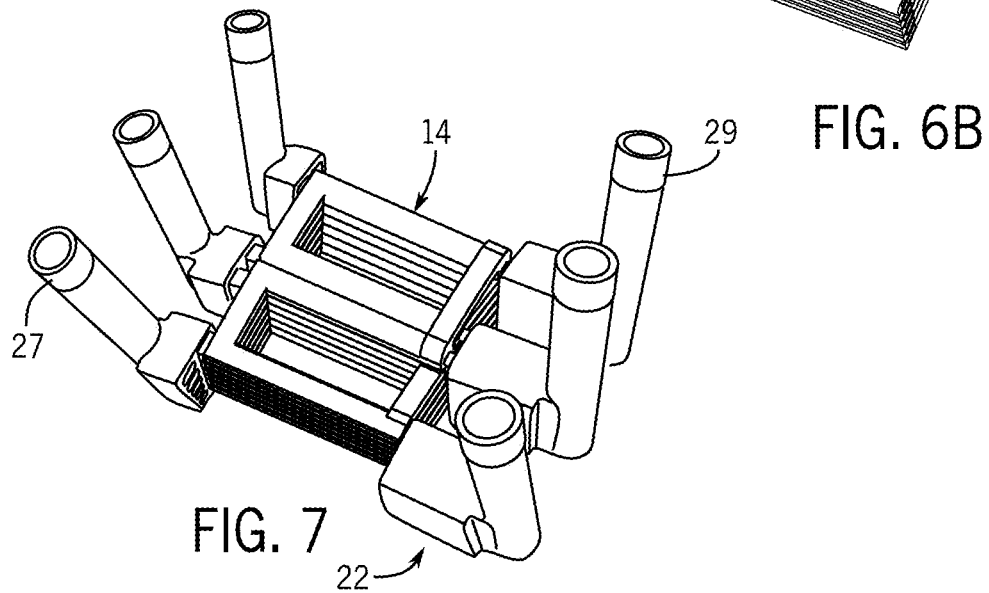
FIG. 7

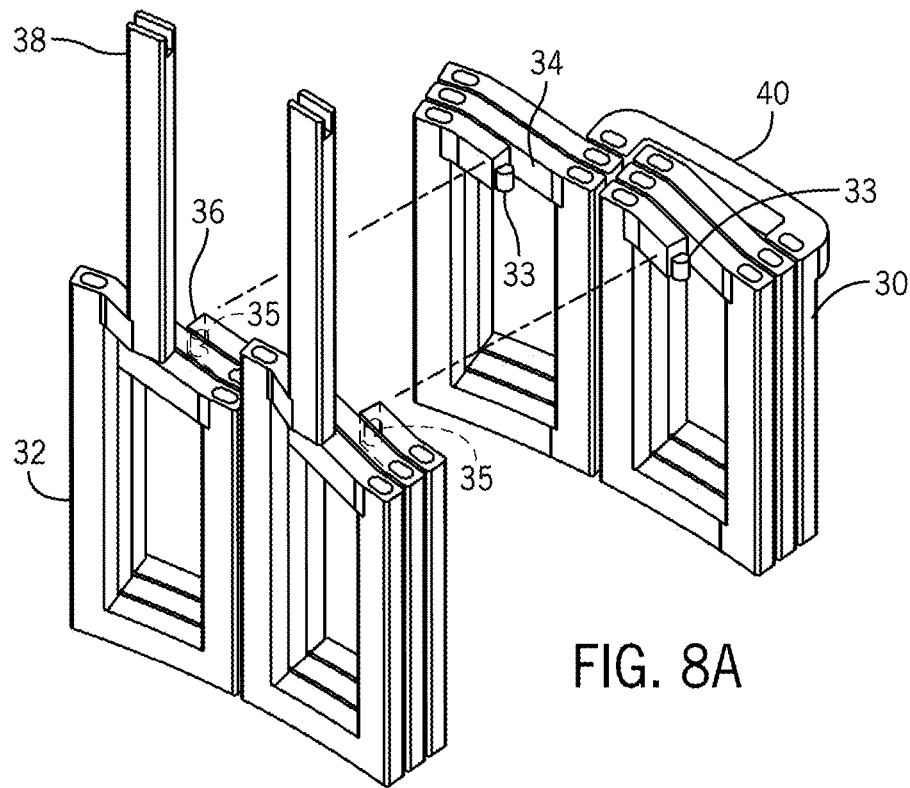
FIG. 8A
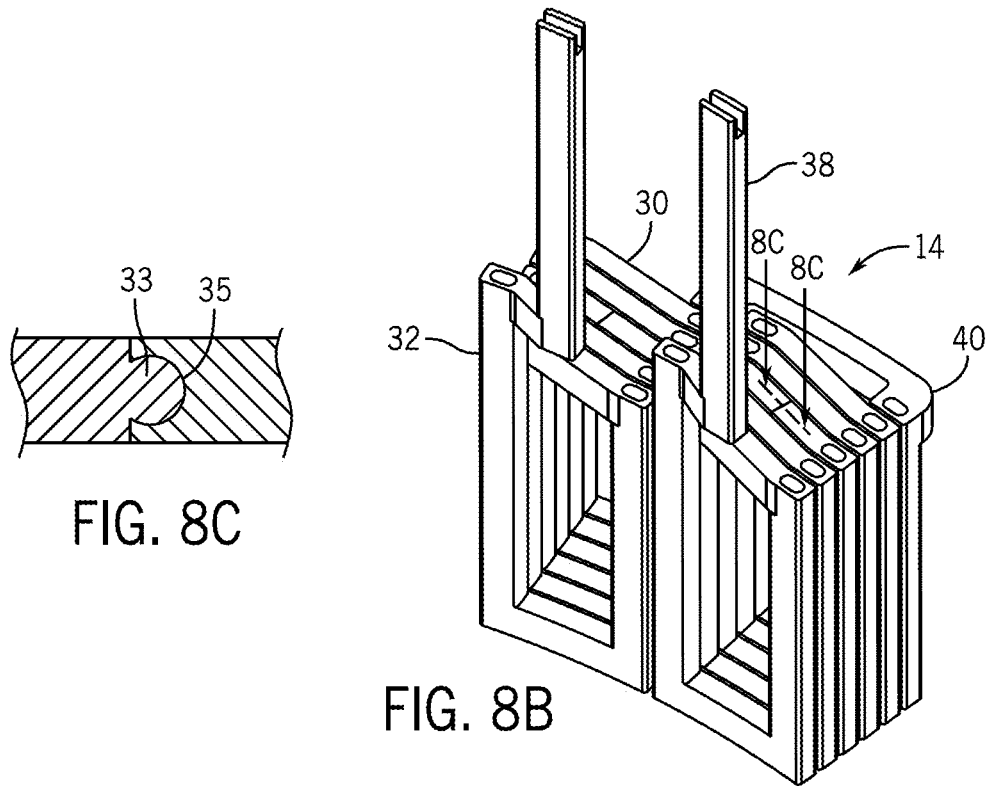
FIG. 8C
FIG. 8B

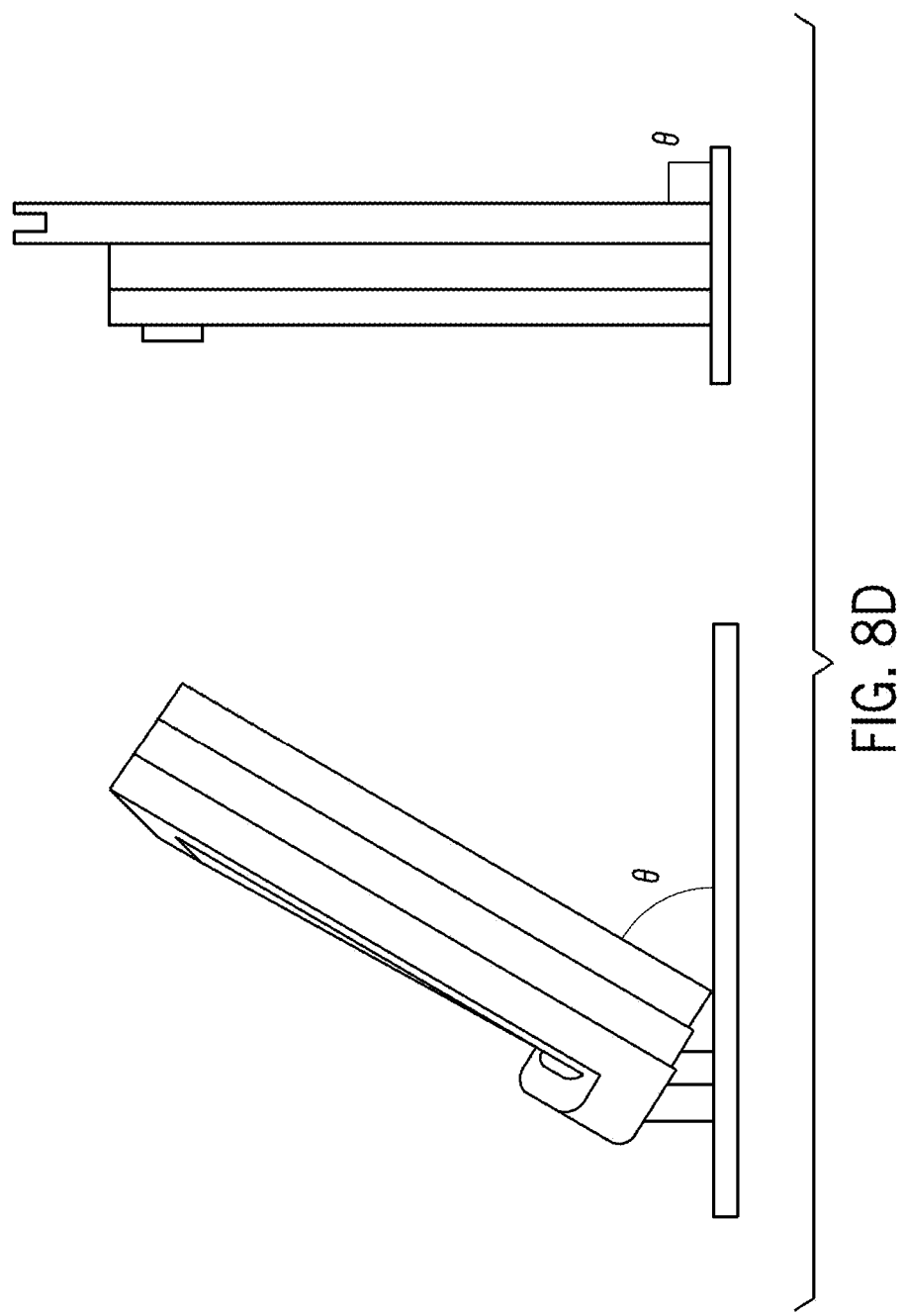

STATOR WINDING WITH INTEGRATED COOLING

CROSS-REFERENCE TO RELATED APPLICATIONS

This application is a continuation-in-part of PCT/US2020/052642 filed on Sep. 25, 2020, and claims the benefit of U.S. Provisional Patent Application No. 62/907,138 filed on Sep. 27, 2019, and also claims the benefit of U.S. Provisional Patent Application No. 63/068,764 filed on Aug. 21, 2020, which applications are incorporated herein by reference in their entirety for all purposes.

BACKGROUND

Specific power of an electric machine is defined as the ratio of output power to total weight. High specific power electric machines are important in electrified transportation systems such as electric aircraft and other vehicles, because they reduce fuel consumption and extend the traveling range of the vehicle. However, technical challenges in electromagnetic, thermal, mechanical and manufacturing issues currently limit the specific power that can be achieved in electric machines.

One major challenge in the design of high specific power electrical machines, for example, relates to high heat loading in the windings, and therefore to controlling losses through cooling management systems. Current commonly used stator cooling methods, including cooling jackets on the outside of the stator, oil spray cooling of the end winding, and flooded stator cooling. In these methods, a high thermal barrier/resistance is provided between the cooling medium and the conductors. For applications where winding supply voltage is high (eg. >800 V) or air pressure is low (eg. <30 kPa), for example, thick insulation (eg. >18 mil) is required to provide sufficient dielectric strength. This makes the commonly-used cooling approaches much less effective since insulation thickness represents a large thermal resistance between the winding losses/heat source and the cooling fluid/medium. Other known cooling methods, such as axial cooling channels inside slots, can provide more effective direct cooling of windings, but also require thick winding insulation, and reduce the slot fill factor, which results in increased conductor losses and decreased efficiency.

SUMMARY

This disclosure describes a cooling method for a stator winding that can use a heat exchanger integrated with winding conductors to provide direct cooling to the winding. In one example, hollow conductors can be provided in the winding, and heat pipes inserted directly into the hollow conductors. Alternatively, heat pipes can be routed directly adjacent and in close proximity to solid or semi-open conductors in the winding. In other alternatives, fluids can be routed through hollow conductors in the winding. These cooling methods remove heat directly from where it is generated, and therefore can cool more effectively than the prior art methods discussed above. Additionally, these methods are insensitive to machine size or length and therefore can be applied in machines of many different sizes and geometries. Further, these methods are not sensitive to system voltage and insulation thickness since the cooling medium is in direct contact with the conductors.

In another aspect of the disclosure, additive manufacturing methods are described that can simplify the fabrication of machine components, enable customization of conductors and windings, and further enable close contact between heat pipes or coolant flows and conductors. Additive manufacturing processes can employ, for example, computer-aided-design (CAD) software or 3D object scanners to direct hardware to deposit material, layer upon layer, in precise geometric shapes, adding material to create an object. As a result, these processes can produce lighter, stronger parts and systems as compared to traditional processes, which are typically subtractive processes that remove material through milling, machining, carving, shaping or other means. In addition, additive manufacturing enables the conductor shapes described in this application that cannot be achieved by any other manufacturing methods.

In one aspect, the current disclosure provides a winding comprising a first plurality of conductive leg members arranged in layers in a first stacked configuration, the layers including at least a top and a bottom layer; and a second plurality of conductive leg members arranged in layers in a second stacked configuration parallel to the first stacked configuration, the layers including at least a top and a bottom layer. The leg member in the top layer of the stacked configuration of the first plurality of leg members is connected at a first end to a leg member of the second plurality of leg members in a corresponding layer in the second stacked configuration; and at a second end to a leg member of the second plurality of leg members in an adjacent layer to the corresponding layer in the second stacked configuration. Successive layers of leg members in the first plurality are connected as described above, until a bottom layer is reached, such that at least one of the first and second ends of the leg member in the second plurality of leg members remains unconnected in the top layer and at least one of the first and second ends of the leg member in the first plurality of leg members remains unconnected at the bottom layer, forming a coil configured to be connected to a power supply. The connections between the first and second plurality of leg members are solid, and at least one duct is formed extending through at least one of the first and second ends of at least one of the first and second plurality of leg members.

The winding can include a plurality of ducts in the first and second plurality of legs. At least one duct can be formed in at least one of the first and second ends of each of the first plurality of leg members and each of the second plurality of leg members. The plurality of ducts can be formed to extend from the first end to the second end, wherein an opening is formed at each of the first and second ends of each of the first and second plurality of legs.

The duct can be sized and dimensioned to receive a heat pipe. Alternatively, the duct can be sized and dimensioned for connection to a cooling fluid flow. In still another aspect, the duct can be formed in a side of the at least one leg to provide a semi-open duct. The duct can extend through the first and second ends of the at least one of the first and second plurality of leg members comprising the duct.

The first and second plurality of legs are formed using additive manufacturing. The first and second plurality of legs can be formed using at least one of direct metal laser sintering, selective laser sintering/melting, selective laser beam melting, direct metal laser sintering, green wavelength laser melting, fuse filament fabrication and fused deposition modeling. The first and second plurality of legs can further comprise at least one of copper, an aluminum alloy, $AlSi_{10}Mg$, and CuCr1Zr.

At least one of the legs in the first plurality of legs can include a connecting element and at least one of the legs in the second plurality of legs can include a mating connecting element, wherein the first plurality of legs and the second plurality of legs are configured to be selectively coupled together. Additionally, at least one of the legs in the first plurality of legs comprising the connecting element can be constructed to have a first electrical conductivity, and the at least one of the legs in the second plurality of legs comprising the mating connecting element can be constructed to have a second electrical conductivity. The first plurality of legs can be coupled to the second plurality of legs through solid end elements.

In another aspect, the current disclosure provides a stator. The stator comprises a plurality of open-slot iron core segments, the open-slot iron core segments being aligned in a side-by side configuration, wherein slots are formed between each pair of adjacent open-slot core segments. A plurality of windings, as described above, are received in one of the slots formed between adjacent ones of the plurality of open-slot iron core segments. The stator can include at least one heat pipe extending in the duct, the at least one heat pipe being configured to cool heat produced within the respective stator segment. The stator can also include a heat exchanger, the heat exchanger comprising at least one coolant pipe configured to provide coolant to the winding in the stator. The heat exchanger can be constructed using additive manufacturing, such as fuse filament fabrication, and can be constructed of a thermoplastic, a nylon, or a metal. The heat exchanger can include at least one cooling block comprising apertures receiving an end of the heat pipe, and the at least one coolant pipe can provide coolant flow to the cooling block. The stator can include a plurality of ducts and a plurality of heat pipes, wherein one of the plurality of heat pipes extends through each of the plurality of ducts. The stator can be provided in an electric machine comprising a rotor including a plurality of permanent magnets.

In still another aspect of the invention, an electric machine is disclosed. The electric machine comprises a stator comprising a plurality of open-slot iron core segments, the open-slot iron core segments being aligned in a side-by side configuration, wherein slots are formed between each pair of adjacent open-slot core segments; and a plurality of windings each of the windings comprising a first plurality of legs connected to a second plurality of legs through a corresponding plurality of solid end members configured to form a coil configuration, each of the legs in the first plurality of legs and each of the legs in the second plurality of legs comprising a duct extending from a first end to a second end. A heat exchanger comprising a coolant inlet and a coolant outlet is coupled to at least one of the ducts in one of the plurality of windings to cool the corresponding winding. The machine further comprises a rotor including a plurality of permanent magnets.

The heat exchanger can include a cooling block comprising a plurality of apertures, and a plurality of heat pipes extend between the ducts in the windings and apertures formed in blocks in the heat exchanger. The heat exchanger can comprise a second cooling block comprising a second plurality of apertures, and a second plurality of heat pipes, the second plurality of heat pipes in thermal communication with a circuit for driving the machine. The electrical machine can also include a heat sink in thermal communication with the circuit. The heat pipes can be in thermal communication with the heat sink. The circuit can be received in a housing, and the housing can be in thermal communication with the heat sink. The coolant inlet and coolant outlet are directly connected to the ducts in the winding.

In another aspect, a winding is disclosed. The winding comprise a first plurality of legs connected to a second plurality of legs through a corresponding plurality of solid end members. The first plurality of legs, second plurality of legs, and solid end members are together configured to form a coil configuration. The winding is constructed using additive manufacturing to include a duct extending through each of the legs in the first plurality of legs and each of the legs in the second plurality of legs. The ducts are configurable to provide direct cooling to the winding.

In still another aspect of the disclosure, a heat exchanger comprises a cooling block. The cooling block includes a duct extending from an upper surface to a lower surface and a plurality of apertures sized and dimensioned to receive at least one heat pipe. A coolant inlet conduit is in fluid communication with a first end of the duct in the cooling block; and a coolant outlet conduit, the coolant outlet conduit in fluid communication with a second end of the duct in the cooling block. The heat can be additively manufactured in, for example, a nylon construction. The heat exchanger can include at least a second cooling block, the second cooling block comprising a duct extending from an upper surface to a lower surface and a second plurality of apertures formed in a side of the second cooling block, each of the second plurality of apertures being sized and dimensioned to receive a heat pipe. The duct is in fluid communication with the coolant conduit inlet at a first end and is in fluid communication with the coolant conduit outlet at a second end.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 1A is a side view of a segmented stator structure with heat pipes in a tooth-winding permanent magnet (PM) machine constructed in accordance with the disclosure;

FIG. 1B is a perspective view of a winding assembly in the machine of FIG. 1A;

FIG. 1C is an exploded view of a winding in the machine of FIG. 1A;

FIG. 2A illustrates heat pipes integrated between two coil sides (solid conductors);

FIG. 2B illustrates heat pipes inserted into hollow conductors;

FIG. 2C illustrates heat pipes integrated with semi-open conductors;

FIG. 2D illustrates a configuration in which solid and hollow conductors are combined to reduce AC losses;

FIG. 2H is a magnified view of the layers of a winding of FIG. 2G;

FIG. 4A illustrates a dual winding constructed in accordance with the disclosure using additive manufacturing;

FIG. 4B illustrates a single winding structure with corresponding insulation;

FIG. 4C illustrates the single winding of FIG. 4B with input and output conductors;

FIG. 6A is a perspective view of a heat pipes and heat exchangers in a winding assembly constructed in accordance with the disclosure;

FIG. 6B is a top view of the heat pipes and heat exchangers in the winding assembly of FIG. 6A;

FIG. 7 is a perspective view of a winding assembly using coolant flow and heat exchangers in accordance with the disclosure;

FIG. 8A illustrates windings constructed in component parts using additive manufacturing;

FIG. 8B illustrates the windings of FIG. 8A as assembled;

FIG. 8C illustrates the interconnecting joint between component parts of FIG. 8A;

FIG. 8D illustrates the construction of the windings of FIGS. 8A and B in different orientations;

DESCRIPTION

Figure 1D:
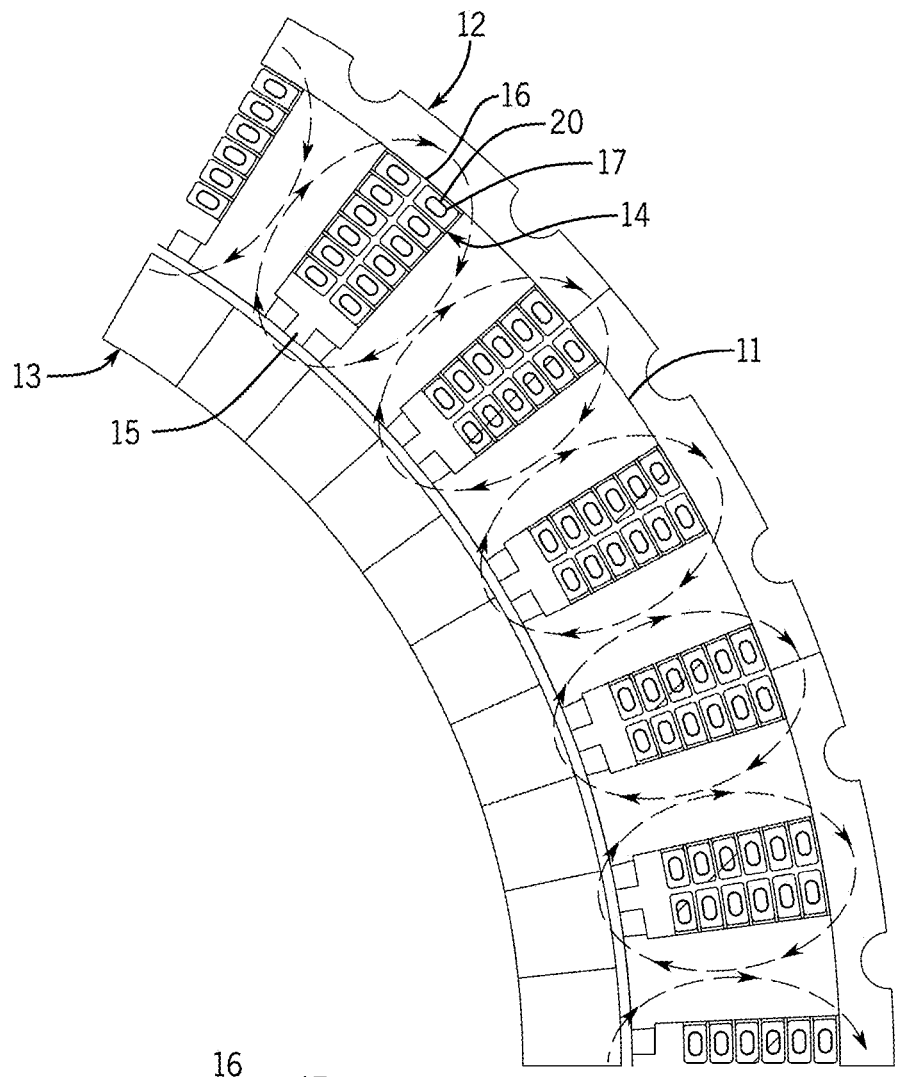
FIG. 1D is a partial view of the stator of FIG. 1A, illustrating hollow conductors in the windings.

The disclosure addresses cooling methods for a stator winding that uses a cooling device integrated with conductors in the winding to provide direct cooling to the winding. Referring now to FIG. 1A, a machine drive 10 which includes a rotor 13, and a segmented stator structure 12 constructed in accordance with the current disclosure is shown. Referring now also to FIG. 1D, the stator 12 comprises a plurality of open-slot iron core segments 11 aligned side by side to form a circular structure, with slots 15 formed between each pair of adjacent open-slot core segments. Referring now also to FIG. 1B, the slots 15 are filled with coils or windings 14 comprising side or leg conductors 16 and end conductors 21, laminated cores 18, heat pipes 20, and a heat exchanger 22, which can carry a coolant flow through inlet and outlet pipes 27 and 29. As described more fully below, the winding shape can be optimized to occupy the available space within the slot 15 to maximize the copper slot fill factor, which helps increase the electric loading.

Referring still to FIGS. 1A-1D, the leg conductors 16 in the winding 14 can have a duct 17 and a solid cross section in the end conductors 21. That is, the leg conductors 16 inside the slots 15 (extending axially) can be hollow, while end conductors 21 at the ends of the machine (extending circumferentially to the machine and between the conductors) can be solid. This construction enables access to the hollow conductors 16 from both ends of the machine 10 and further enables integrating up to two sets of heat pipes 20 into the hollow conductors 16 on each end of the machine 10. The inclusion of multiple heat pipes 20 significantly increases the cooling effectiveness, current density, and electric loading of the machine 10 as compared to that of the machines cooled through conventional approaches like cooling jacket, spray coil, flooded stator, etc. Additive manufacturing (AM) processes, as described below, can be used to construct components of the system including the windings 14 and heat exchanger 22. Additive manufacturing can be applied to simplify manufacturing of complex geometries; improve material properties through mixing of different materials and purposely controlling the grain texture of the material; and multi-material processing and near-net-shape manufacturing which can simplify the manufacturing of electrical machines. These processes further enable scaling the machine in different sizes, and the construction of components with tight tolerances that can be assembled in extremely close or intimate contact with adjoining parts.

Referring still to FIGS. 1A and B, the heat pipes 20 can be constructed of copper or aluminum, and can include a working fluid such as water, ammonia, ethanol, alcohol, liquid helium, mercury, or sodium, indium. The heat pipes can be sized and dimensioned to be received in the ducts 17 formed in hollow conductors 16, and to cooperate with heat exchangers 22 that can be used for heat dissipation. If the heat exchanger or coolant fluid is conductive (for example, aluminum alloy and water), galvanic isolation can also be provided between the heat pipes 20 and the heat exchangers 22, between the hollow conductors and heat pipes, or both. Alternatively, insulating material can be applied between each heat pipe 20 and the conductors 16 and 21 of the winding 14 to offset the heat conductivity from the heat pipes. Each of these methods is described more fully below.

Referring now to FIGS. 2A-2C, three alternative designs of heat pipes 20 integrated with conductors 16 forming the windings 14 are shown. FIG. 2A illustrates solid conductors 16 with heat pipes 20 extending adjacent and in close proximity to the conductors 16, thereby providing direct cooling. FIG. 2B illustrates, a hollow conductor 16 is illustrated with heat pipes 20 extending through and substantially filling a duct 17 extending through the hollow conductor 16. FIG. 2C illustrates a semi-open conductor 16, which includes an open area in at least one side or edge forming a U- or L-shaped conductor. A heat pipe 20 can be integrated into the open area of the conductor 16. As described above, the conductors 16 can be advantageously formed using additive manufacturing to produce a consistent high tolerance cross section to ensure a tight fit and close contact between components.

When the conductors 16 are hollow or semi-open, the specific position of heat pipes 20 with respect to the conductors 16 can be optimized. Therefore, AC winding loss, as described above, can be minimized and mechanical strength of the end winding can be improved. In addition, the number of heat pipes 20 can be adjusted, depending on the cooling capability required.

Figure 3:
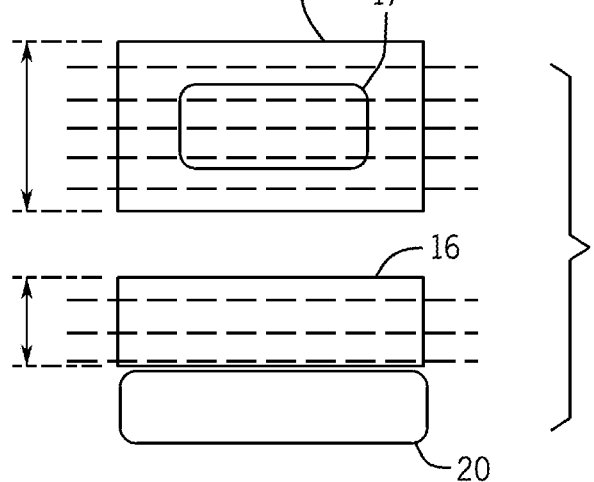
FIG. 3 illustrates flux lines crossing a hollow conductor as compared to flux lines crossing a solid conductor.

Referring again to FIG. 2B, as described above, hollow conductors 16 can be advantageously applied in the direct cooling systems disclosed herein. When compared to prior art stranded windings, however, hollow conductors 16 can suffer from high alternate current (AC) losses due to proximity effect and skin effect. The AC loss is mainly generated by cross-slot leakage flux. Referring now to FIG. 3, a hollow conductor 16 including a duct 17 and a solid conductor 16 with the same area are shown. As illustrated here, the hollow conductor 16 is thicker than the solid conductor and therefore couple more cross-slot leakage flux lines, as shown. Further, when all hollow conductors 16 are used in a winding 14, more than 70% of winding AC losses are concentrated in the first three layers near the slot opening due to higher cross-slot leakage flux density. It is, therefore, desirable to reduce the AC losses when using a hollow conductor.

To reduce AC losses, the slot offset, which is the distance between the inside edge of the slot opening in slots 15 and the conductors 16 nearest the slot opening (See FIG. 11 and corresponding discussion, below), can be increased, such that the slot leakage flux coupled with the conductors is with lower density. Thus, the eddy current losses associated with the slot leakage flux is decreased.

Figure 2F:
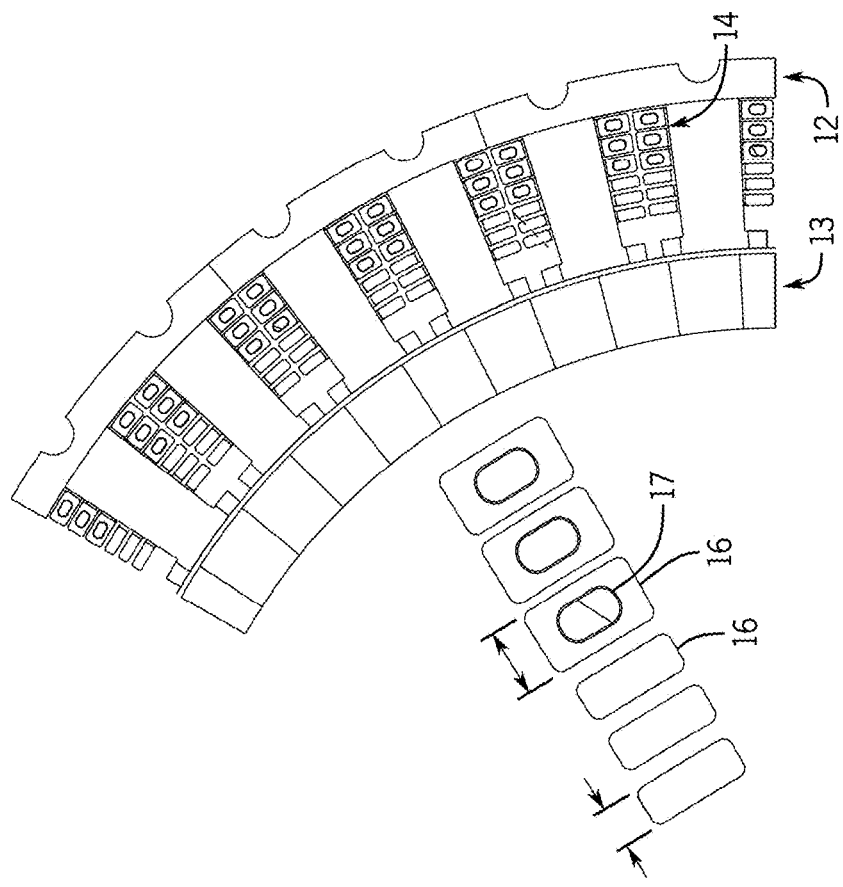
FIGS. 2E and 2F illustrate variations in a winding including solid and hollow conductors.
Figure 2E:
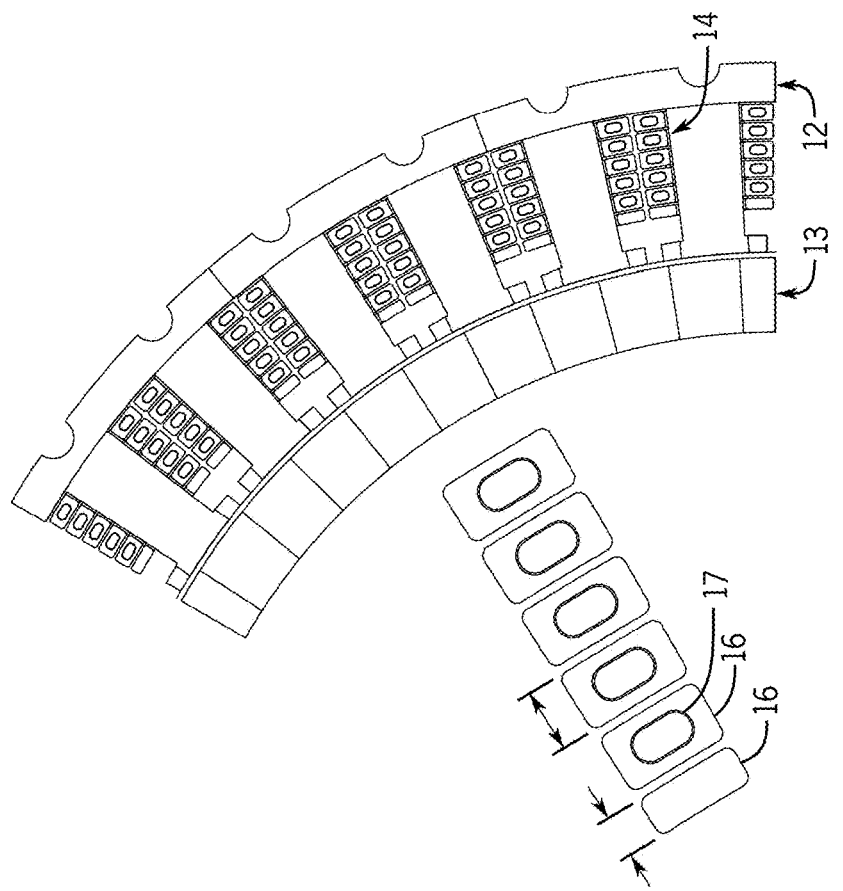

An alternative method to offset AC losses is to provide solid conductors near the slot opening while adopting hollow conductors near the slot bottom, as shown in FIG. 2D. In this particular case, by replacing the first layer of the conductors (near the slot opening) with thinner/lower height solid conductors in the radial direction, total winding AC losses were shown to be reduced by 2.2 kW (25%). Referring also to FIGS. 2E and 2F, the number of hollow conductors and solid conductors, can be varied (for example, 3 solid and 3 hollow, 1 solid and 5 hollow, etc.). Further, the height of the conductors 16 with ducts 17 and solid conductors 16 can be varied, as illustrated. The heights of the solid conductors can also vary from the height of the hollow conductors can also be different, as shown.

Figure 2I:
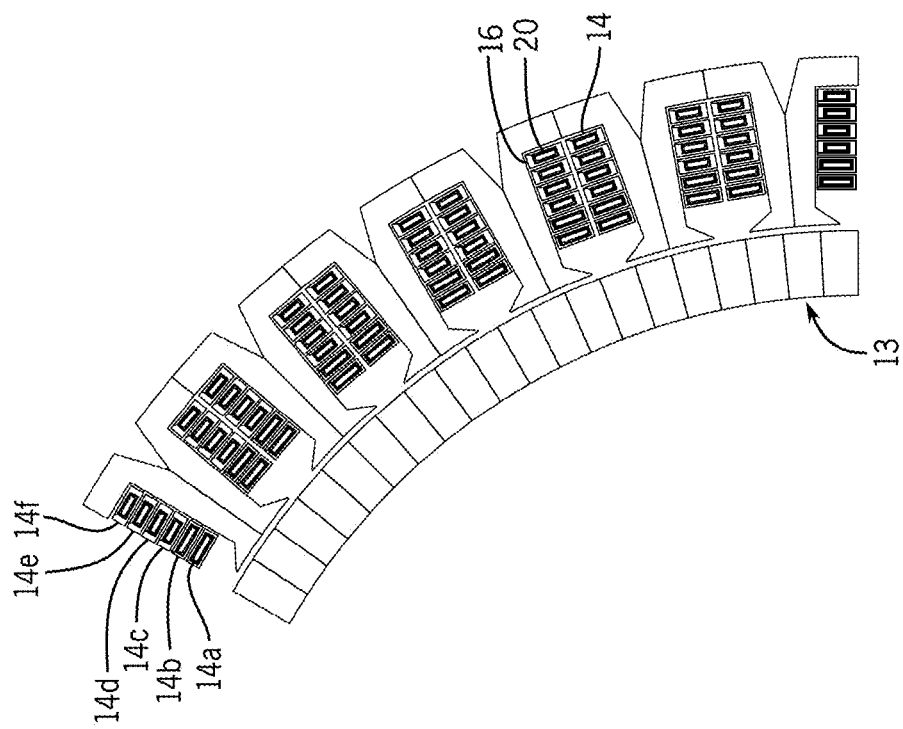
FIG. 2I illustrates windings with different sized heat pipes in alternate configurations to that show in FIG. 2G.
Figure 2G:
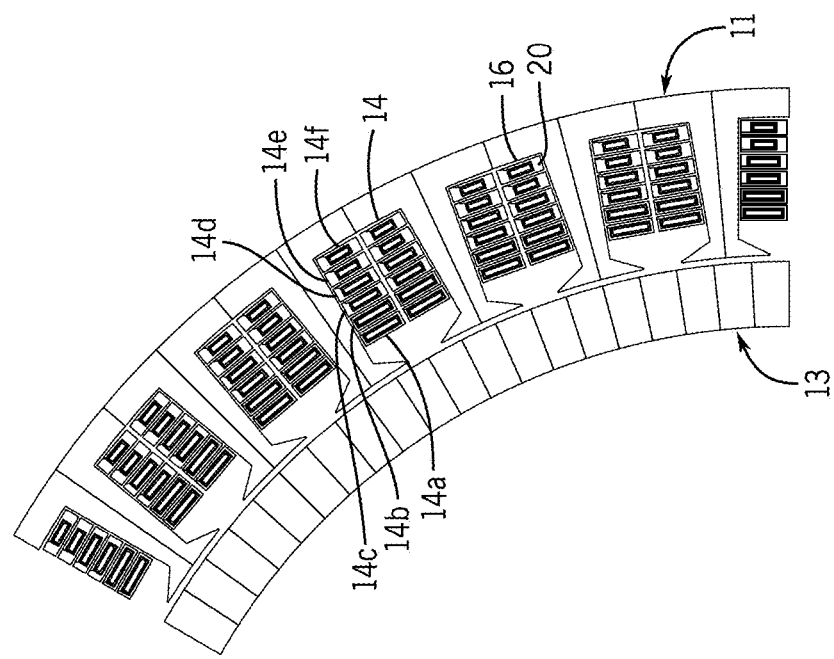
FIG. 2G illustrates a winding in a machine where the size of the heat pipes vary by layer.

Referring now to FIGS. 2G and 2H, an alternative construction of a winding 14 is illustrated. Here, the size of the heat pipes and conductors in the layers 14a-14f of the winding 14 are varied to provide a more uniform loss distribution in each layer. Specifically, in a winding 14, conductors 16 closer to the rotor 13 (FIG. 2G) tend to have higher losses as compared to conductors 16 radially further away from the rotor 13. For example, in one such construction, the loss in the layers of a winding 14 was found to vary between about 58 Watts in a first layer closest to the rotor 13 and about 17-18 Watts in fifth and sixth layers, respectively.

To provide a more uniform heat distribution, smaller heat pipes 20 with lower heat capacity can be used in layers radially distant from the rotor 13, while larger heat pipes 20 can be used closer to the rotor 13 to handle the higher losses/heat load. In the winding 14 of FIGS. 2G and 2H, each layer consists of a conductor 16 formed with an internal duct 17, and a heat pipe 20 received within the duct 17. The heat pipe 20 can be hollow in construction, as illustrated here. In the first and second layers 14a and 14b, the size of both the duct 17 and the heat pipe 20 is larger than in layers 14c and 14d, and those in layers 14c and 14d are larger than the heat pipes 20 in layers 14e and 14f. The size of the heat pipes 20 therefore are larger close to the rotor 13 and smaller further away from the rotor 13. Although the heat pipes 20 here are the same in two subsequent layers, it will be apparent that other constructions are possible. For example, larger heat pipes may be provided only in a selected number of layers closest to the rotor (See FIG. 2I), and the other heat pipes may be of a uniformly smaller size. In other applications, the size of the heat pipe 20 may be different in each layer. That is, the size of the heat pipe can be continually reduced as the distance increases from the rotor 13. Because the Qmax (the maximum possible heat transfer for the exchanger) of the heat pipe 20 is reduced as the size of the heat pipe 20 is reduced, the heat pipes 20 can be sized according to the heat dissipation in each specific layer, or groups of layers, which results in a more uniform temperature distribution. Further, by using smaller heat pipes 20, the overall weight of the winding 14 is reduced, and specific power is increased. The heat pipes 20 can be arranged in many different ways to address different temperature profiles, and the specific configurations here are given only by way of example.

To optimize the size of the heat pipe 20, the losses can be evaluated in each conductor 16 using finite element analysis (FEA). Based on the calculated losses, a suitable heat pipe 20 can be selected based on either experimental measurement of the max heat load Qmax or predetermined value in datasheets. An appropriate heat pipe 20 can, for example, be selected to provide 75% of its Qmax, thereby allowing a 25% safety margin.

In another alternative, windings 14 can be constructed to have variable electrical conductivity (EC). For example, using additively manufactured techniques, build orientation can be adjusted to vary the EC, as described with reference to FIG. 8D, below. Materials used in these additively manufactured processes, further, have lower electrical conductivity than copper. AlSi$_{10}$Mg alloy, for example, has an electrical conductivity between 15.7 M and 17.6 MS/m, which is 27-30% of the conductivity of copper as defined in the International Annealed Copper Standard (IACS). The reduced EC can be used to counter eddy currents found in traditional copper constructions.

Referring now to FIGS. 4A and 4B, dual windings 14A, 14B and a single winding 14 are illustrated. Each of the windings 14 include substantially parallel hollow side or leg conductors 16 that include ducts 17, and that extend axially in the machine 10. The top layer of side conductors 16a are connected at a first end by an end conductor 21a which is solid in construction. At the opposing end, an angled end conductor 21b, which is also solid in construction, connects one of the side conductors 16a in the top layer to a side conductor 16b in a second layer. Subsequent layers can therefore be stacked to form a continuous conductive winding or coil. Although the side conductors 16 and end conductors 21 are described as separate components, the components can be individual components which are adhered together, or can be formed as an integral structure. The end conductor can be constructed as an arc to correspond to the inside and outside diameters of the stator. One end of the winding 14 can be connected to a connector 38 for connection to a power supply, and the opposing end can be connected to a connector 39. A bridging end conductor 40 can connect two adjacent windings 14 to form the dual winding illustrated in FIG. 4A by connecting side conductors 16a in the top layers of two adjacent windings 14 as shown. Similar input and output connectors 38 and 39 are illustrated for the single winding in FIG. 4C.

As described in detail below, the windings 14 can be constructed of AlSi$_{10}$Mg using AM techniques such as direct metal laser sintering (DMLS). These DMLS-based windings can be constructed with a thin wall having a thickness smaller than the skin depth (which is dependent on the excitation frequency and material conductivity), which is advantageous to provide hollow conductors with low overall thickness, such that the conductor 16 will couple with less cross slot leakage flux, resulting in reduced AC losses. The density of the coil samples can be, for example, 2.668 g/cm$^3$ (eg.: dual coil: 82.4 g, 30.9 cm$^3$), resulting in coils that are 99.92% dense. The coils constructed of AlSi$_{10}$Mg can be produced with a resolution of 0.0008"~0.0024" in the z-axis; 0.035"~0.045" in the x- and y-axes).

Referring now to FIG. 4B, insulation 19 such as insulation paper can be provided as slot liners (between the stator core and winding), turn-turn (between conductor bars), and phase-phase insulation (between windings that belong to different phases). In one example, United Laboratories class H ELAN-Film HT-180 insulation paper (thickness: 18 mil) was advantageously used for the insulation. Silicone gel can be used to fill any gaps between the heat pipes and the inner surfaces of the hollow conductors 16. The direct cooling approach, therefore, can be employed with very thin insulation, as compared to prior art cooling systems. Although a specific insulating material is described here, it will be apparent to those of skill in the art that various insulating materials can be selected depending on operating parameters such as temperature, humidity and air pressure.

Figure 5A:
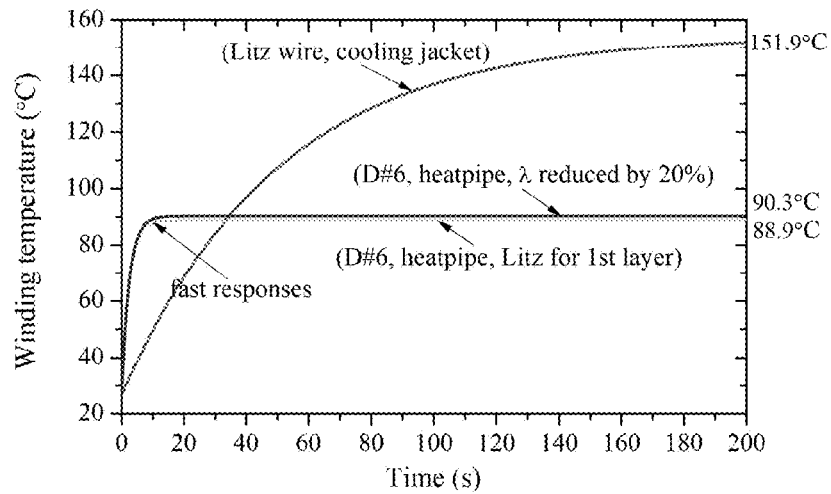
FIG. 5A illustrates a thermal analysis of hollow conductor integrated with integrated cooling showing a temperature rise (heat pipe)

Referring now to FIG. 5A, a chart illustrating comparative cooling of a traditional Litz wire with cooling jacket, and a heat pipe 20 constructed in a hollow conductor 16 as described above is shown. As illustrated here, heat pipes 20 provide significantly improved cooling capability, resulting in a fast temperature response (~10 s) and low steady state temperature (~60° C. lower than conventional design with stator cooling jacket).

Heat pipes 20, therefore, can be implemented to provide a high level of cooling, with minimally thick conductors, and minimally thick insulation, while further minimizing AC losses and reducing the eddy current losses generated on the thin copper wall of the heat pipes. Additionally, the described constructions enable scalable machine design with high system voltages or systems with high electrical stress, determined by changes in voltage with respect to time, air pressure, temperature, humidity, and other environmental factors.

Referring again to FIGS. 1A and 1B, and now also to FIGS. 6A and 6B, perspective and top views of a winding 14 constructed with hollow conductors 16 and heat pipes 20 received in hollow conductors 16 at one end and a heat exchanger 22 at the opposing end are shown. The heat exchanger 22 can include one or more cooling block 23 including apertures 25 corresponding in size to the ducts 17 in the conductors 16, and which receive the opposing ends of the heat pipes 20 opposite the ends inserted into the conductors. Coolant pipes 27 and 29 provide a coolant flow in and out of the machine 10, respectively, and provide coolant flow to the cooling blocks 23 through conduits 31 extending through the cooling blocks 23. The heat exchanger 22 can advantageously be manufactured using fuse filament fabrication (FFF). Nylon-12 PA thermoplastics have been shown to be useful to achieve tight connections between parts while reducing the weight of the heat exchangers as compared to heat exchangers made of metal, for example. Where metal heat exchangers are used, galvanic isolation can also be provided between the heat pipes 20 and the heat exchangers 22. Galvanic insulation can be provided between the heat exchanger 22 and heat pipes 20, between hollow conductors 16 and heat pipes 20, or both. In other applications, various other types of interface materials can be provided between the conductors 16 and heat pipes 20, including boron nitride coating provided on the heat pipes 20, thermal paste or composites, or vacuum pressure impregnation (VPI) which can be used to fill the space between the heat pipes 20 and conductors 16 with epoxy resin.

Referring now to FIG. 7, because the coils constructed in accordance with the disclosure provide access to the duct 17 inside the hollow conductors 16, a machine 10 constructed in accordance with the disclosure can also employ direct cooling through coolant flow inside the ducts 17 of the conductors 16. That is, coolant can be routed directly through the winding 14. Here, heat exchanger 22 includes coolant inlets 27 and outlets 29 connected to the ducts 17 to provide direct cooling. The cooling inlets and outlets can be constructed using FFF and Nylon-12 PA thermoplastics. As discussed above, and the coil can be constructed of AL Si$_{10}$Mg.

Figure 5B:
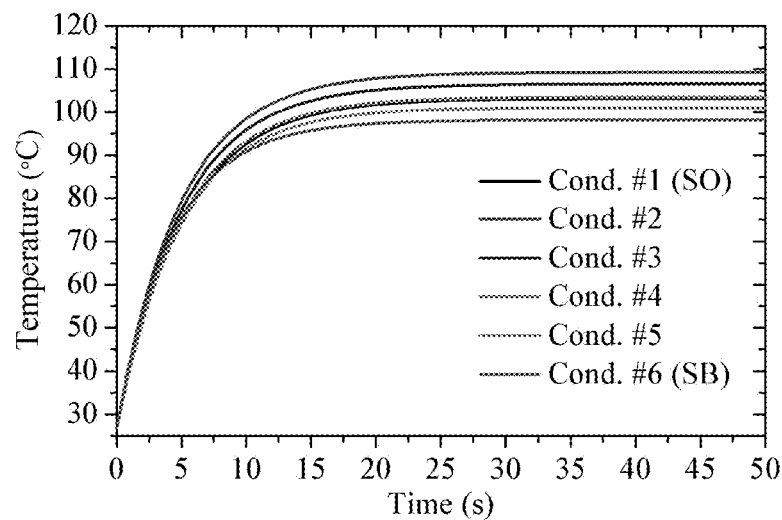
FIG. 5B is a graph illustrating temperature rise vs. time for coolant flow through the hollow conductor.

Referring now to FIG. 5B, temperature rise versus time is illustrated for a hollow conductor 16 cooled with ethylene glycol for six different layers from the slot opening to the slot bottom. Here, the steady-state winding temperature is lower than 110° C. (~40° C. lower than conventional design with stator cooling jacket, as illustrated in FIG. 5A) An equivalent thermal resistance of ~0.02 K/W and continuous current density of 20 A/mm$^2$ or higher can be achieved when using the parameters described in the example below.

Referring again to FIGS. 1A-1D and now also to FIGS. 8A-D, using additive manufacturing (AM) techniques, the windings 14 can be constructed in component parts and assembled. The component parts can include upper components 30 (close to the opening of slot 15 when assembled in the stator) and lower components 32 (close to the bottom of slot 15 when assembled). The upper and lower components 30 and 32 can further be constructed to include interconnecting joints 34 and 36 enabling interconnection of the upper and lower parts 30 and 32 at an end region. FIG. 8A illustrates coils constructed to include a tongue 33 and groove 35 type interconnection; FIG. 8B illustrates the components as interconnected; and FIG. 8C illustrates the joint between the components. Although a specific joint is illustrated here, various other joints can be used, including welding, bolts, a junction box, etc. The windings 14 can also be constructed using multiple layers, as discussed above. For example, in one construction, a three-layer structure was advantageously used.

When windings 14 are constructed of separate component parts, the upper and lower parts 30 and 32 can be built with different electrical conductivity (EC) to further reduce losses in winding 14. The electrical conductivity (EC) of additively manufactured conductors 16 can be controlled to address both AC and DC losses. Conductors near the slot opening can be designed with a comparatively low EC to reduce winding AC losses while conductors near the slot bottom can be designed with a comparatively higher EC to reduce direct current (DC) losses. Determinations of proper EC values for individual designs can be determined following the process described with reference to FIG. 9.

Referring now to FIG. 8D, to provide varying EC, the components 30 and 32 can be constructed using selective laser sintering, such as DMLS. In this process, components are constructed layer by layer on a powder bed. After building a first layer, the power bed moves up vertically for the next layer. Following this process, the components 30 and 32 can be constructed at different orientations to the powder bed, which will result in different electrical conductivities. For example, the upper components 30 can be built with different orientation angles, i. e. θ=90° and θ=60°, where the construction at a 60 degree orientation to the powder bed has a higher EC than one with a 90 degree orientation. $AlSi_{10}Mg$ having variable that is controlled during laser beam melting can be used in this process. Based on built orientation, the EC of annealed additively manufactured $AlSi_{10}Mg$ can vary from 15.7 M S/m to 17.6 M S/m while that of cast $AlSi_{10}Mg$ is 23 M S/m.

Figure 9:
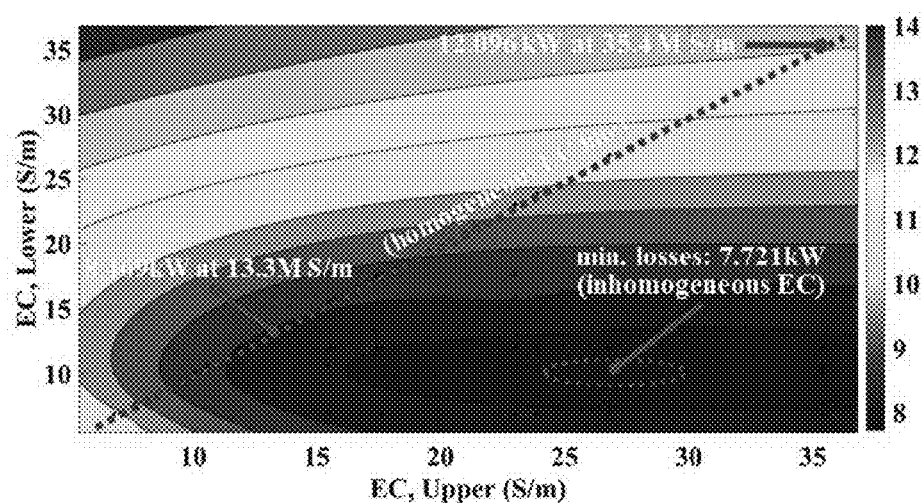
FIG. 9 is a graph illustrating winding AC losses as a function of EC combinations.

In order to search for the optimum combination of ECs in the upper and lower parts 30 and 32 of the conductors, ECs of upper and lower parts were varied from 6.85 M S/m to 35.4 M S/m. FIG. 9 shows the curve fitting results (interpolant, method: thin-plate spline) based on 42 data points. As can be seen in FIG. 9, the minimum winding AC loss is achieved approximately at 26 M S/m (upper part) and 8 M S/m (lower part). One approach to achieve this optimum combination is through the use of pre-annealed additively manufactured $AlSi_{10}Mg$ (7.65 M S/m) for the lower part and cast Aluminum-1350 (26.8 M S/m) for the upper part at 100° C. As for designs with homogeneous ECs, the minimum winding AC losses achievable along the inhomogeneous EC line in FIG. 6 are 8.469 kW, which is 9.7% higher than the optimal case (AC losses: 7.721 kW). This corresponds to the use of T6-annealed additively manufactured $AlSi_{10}Mg$ (build orientation: vertical; EC: 13.3 M S/m) at 100° C. Compared to these results, the use of pure cast Aluminum coil design results in significantly higher winding AC losses (eg.: 12.096 kW, EC: 35.4 M S/m, material: cast Aluminum-1350).

In some applications, the AM coils 14 can be heat treated, which can improve electrical and thermal conductivity, as well as other properties. For example, T6 heat treating processes, which apply a thermal cycle consisting of a solution heat treatment followed by a water quenching and then either an age or precipitation hardening can be applied to the coils 14. The solution heat treatment results in an improvement of alloy ductility.

Example Construction Optimizing Electromagnetic Design

Figure 10:
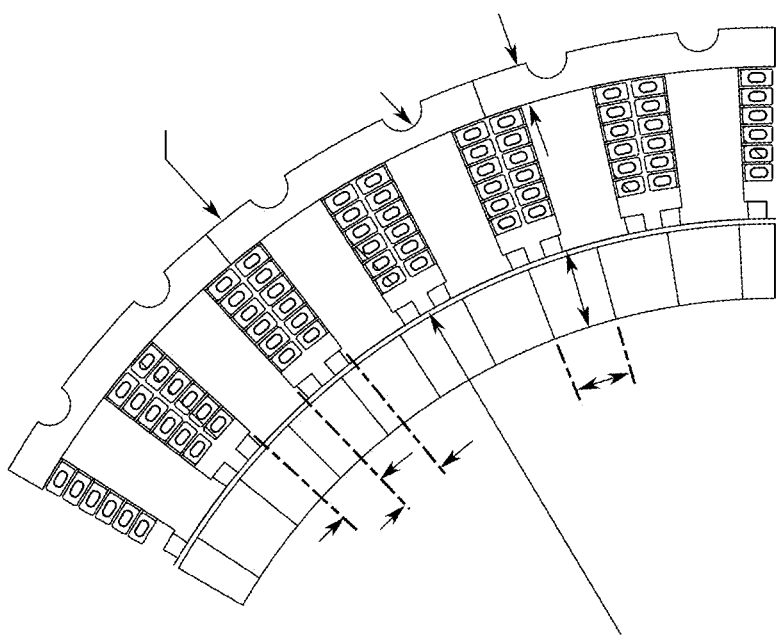
FIG. 10 is a section view of a 36-slot/30-pole FSCW-IPM machine (1/6 model) constructed in accordance with FIG. 1.

Referring again to FIG. 1 and FIG. 1D, to evaluate the disclosed systems, a specific design was used to investigate AC losses and efficiency. The design of FIG. 10 shows a partial view of a 250 kW 36-Slot/30-Pole FSCW-SPM machine of the type illustrated in FIG. 1 with hollow conductors 16, a spoke-PM rotor 13, and permanent magnets. The laminated core was constructed of FeCo. The hollow area 17 inside each conductor 16 was constructed to accommodate a flattened heat pipe 20 (thickness: 2.0 mm, width: 3.65 mm, maximum heat load: 15 W, maximum operating temperature: 110° C.).

The parameters and dimensions of the design of FIG. 10 are summarized in Table I. As can be seen here, the maximum rotor tip speed is 78.5 m/s to avoid high winding losses. Maximum winding current density is 15 $A_{rms}/mm^2$. By having a spoke-PM rotor 13 and high-permanence magnets, an air gap radial flux density of 1.5 T is achieved, indicating that the magnetic loading is high. Soft magnetic materials, such as Cobalt-Iron ("Vacoflux 48" by Vacuumschmelze) can be used in stator 12 and rotor 13 iron cores. The heat pipes were constructed of copper with a cross section of 3.65 mm×2 mm and a length of 120 mm. The wall of the heat pipe was 0.3 mm, and deionized water was provided in the heat pipe.

TABLE AI

DIMENSIONS AND PARAMETERS OF MACHINE DESIGN

| Parameter/Metric | Value |
|---|---|
| Slot/Pole Combination | 36S/30P, SPP = 2/5 |
| Rotor Outer Diameter | 300 mm |
| Tip Speed @ 5000 r/min | 78.5 m/s |
| Torque; Torque Ripple | 477.7 Nm; 11.1 Nm |
| Rotor Shear Stress | 11.39 psi |
| Permanent Magnets | Arnold Recoma 35E @ 120° C. |
| Thickness of Magnets | 12 mm |
| Airgap Length | 1.0 mm |
| Retaining Sleeve Thickness | 0.5 mm |
| Stack Length | 43.08 mm |
| Stator Outer Diameter | 385.2 mm |
| Stator Winding | $AlSi_{10}Mg$, EC: 17.6M S/m |
| Series Turns Per Phase | 72 |
| Phase Current | 205 Arms |
| Current Density | 13.9 $Arms/mm^2$ |
| DC Bus Voltage | 1062.8 (SVPWM) |
| Electric Loading | 94,266 Arms/m |
| Stator Lamination | Vacoflux 48 |
| Ld/Lq | 167.4 uH/165.9 uH |
| Active Mass | 13.59 kg |
| Specific Power | 18.38 kW/kg |
| Torque Density | 35.2 Nm/kg |
| Winding AC Losses | 8.753 kW |
| Efficiency @ 5000 r/min, 250 kW* | 94.34% |

*Core losses, PM losses and winding solid losses are considered.

Figure 11:
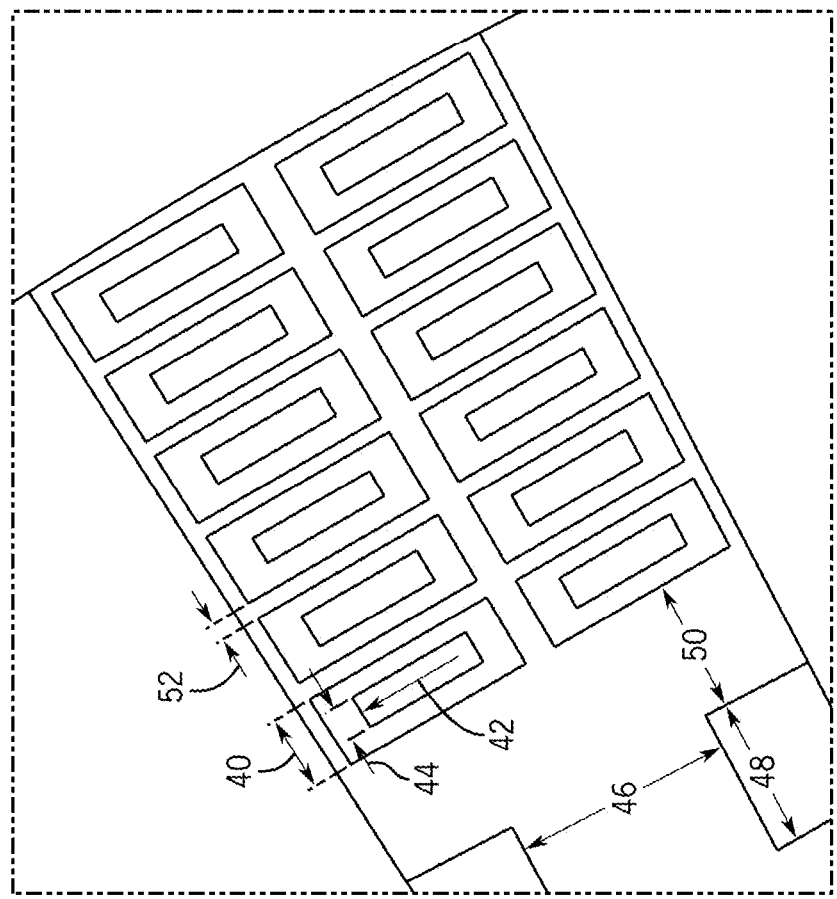
FIG. 11 is a cross-section of a winding of FIGS. 1 and 10 illustrating dimensions to be varied to optimize electromagnetic parameters.

FIG. 11 illustrates a cross section of a winding 14 and dimensions that were varied to optimize the electromagnetic. Dimensions that can be adjusted include the height 40 of the conductor 16 ($h_{cond}$), the width 42 and height 44 ($w_{duct}$, $h_{duct}$) of the duct 17, the width 46 and height 48 of the slot opening ($w_{so}$ and $h_{so}$), and the slot offset 50 (distance between the inside edge of the opening of slot 15 and the first hollow conductor 16 ($h_{void}$)). In analyzing electromagnetic designs the duct thickness and insulation thickness (space between each of the hollow conductors) were maintained as constants.

Duct thickness ($h_{duct}$=1 mm) and insulation thickness ($h_{insul}$=0.508 mm) were held constant, and other parameters were varied in predetermined reasonable ranges. Here, reasonable ranges were selected that would, for example, not result in destruction of components of the system or degrade machine performance by providing a significantly higher AC loss in the winding, lower output torque, etc. Specifically, wall thickness ($h_{cond}$-$h_{duct}$)/2 was varied from 0.408 mm to 1.016 mm; slot opening offset ($h_{void}$) was varied from 1.016 mm to 4.572 mm, in steps of 0.508 mm; slot opening width parameter $w_{so}$ was varied from 1.0° to 1.5°, in steps of 0.1° and slot opening height parameter $h_{so}$ was varied from 2.5 mm to 5 mm, in steps of 1 mm; and duct width parameter $w_{duct}$ has been varied from 1.15° to 1.45°, in steps of 0.1°.

Figure 12:
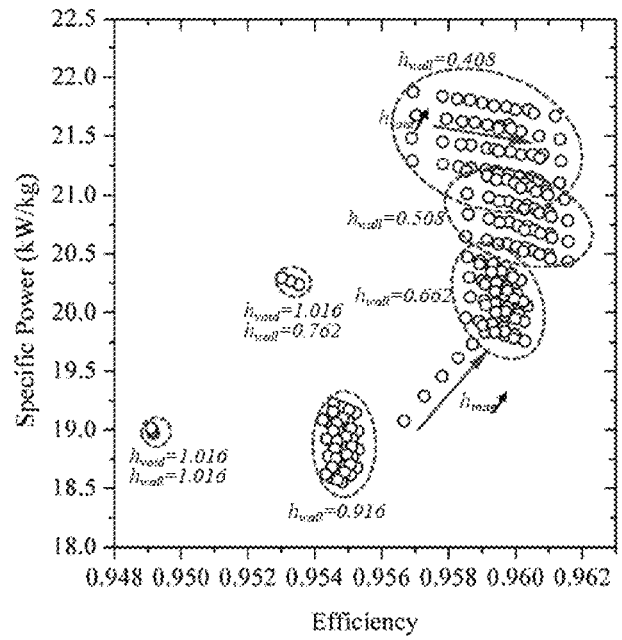
FIG. 12 is a graph of specific power as a function of efficiency based on varying the dimensions of FIG. 11.
Figure 13:
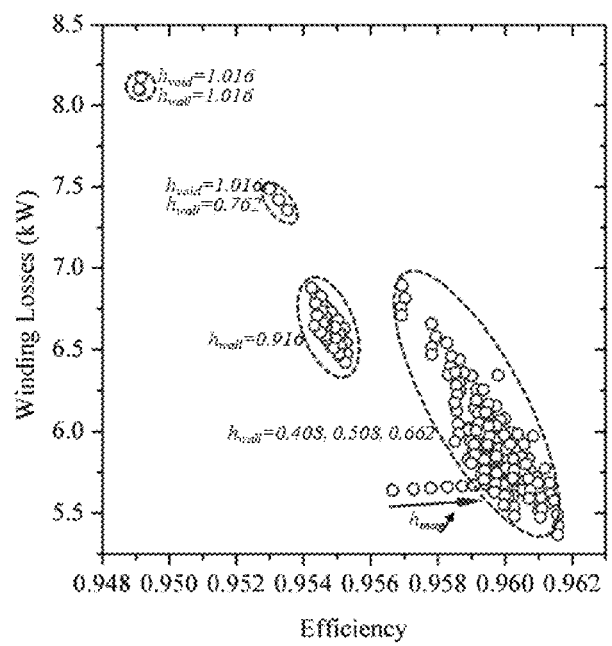
FIG. 13 is a graph illustrating AC losses as a function of efficiency based on varying the dimensions of FIG. 1.

Graphs illustrating the specific power versus efficiency and winding loss versus efficiency over these ranges are illustrated n FIGS. 12 and 13. As can be seen in FIGS. 12 and 13, the major factors in improving specific power and decreasing winding losses while maintaining high levels of efficiency are the conductor wall thickness and slot opening offset. Thinner wall thickness (coupled with less cross-slot leakage flux) and large offset help reduce the AC losses.

However, thin walls can be problematic in terms of mechanical strength while large slot opening offset will increase the iron losses and stator mass. To optimize efficiency while avoiding these problems, wall thickness of 0.662 mm and slot opening offset of 4.064 mm have been shown to be effective to achieve (1) >20 kW/kg specific power; (2) >95.8% machine efficiency; and (3) <6.0 kW winding AC losses.

A high specific power of 20.17 kW/kg has therefore been obtained with fundamental electrical frequency of (1.25 kHz), rotor tip speed of (78.5 m/s), airgap shear stress of (11.95 psi), current density of (20.09 $A_{rms}/mm^2$) and electric loading of (94 $kA_{rms}/m$). The winding AC losses is 5.742 kW at full speed, and full load while the machine efficiency is 95.89%.

Figure 14A:
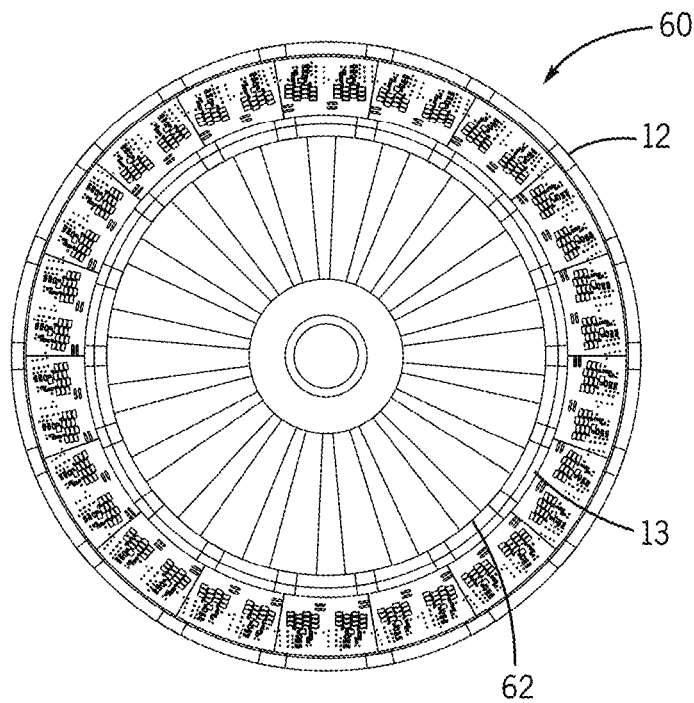
FIG. 14A is a perspective view of an electrical machine constructed with a stator of FIG. 1A.
Figure 14B:
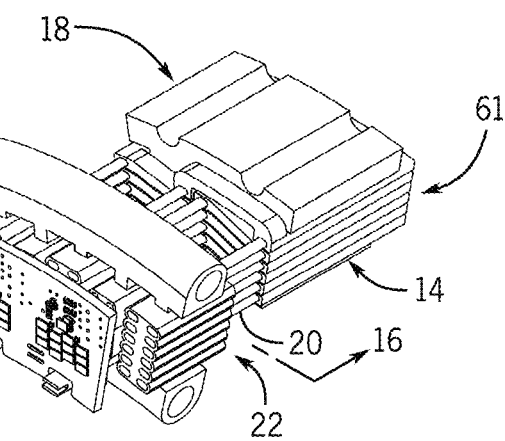
FIG. 14B is a perspective view of a stator segment with integrated power electronics for driving n exploded view of the segmented stator structure of FIG. 1A integrated with a drive system.
Figure 14C:
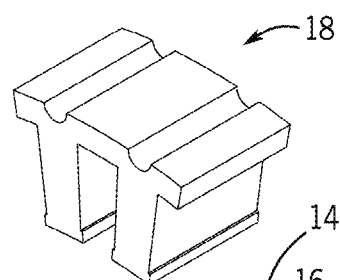
FIG. 14C is an exploded view of the stator segment of FIG. 14B.
Figure 14C:
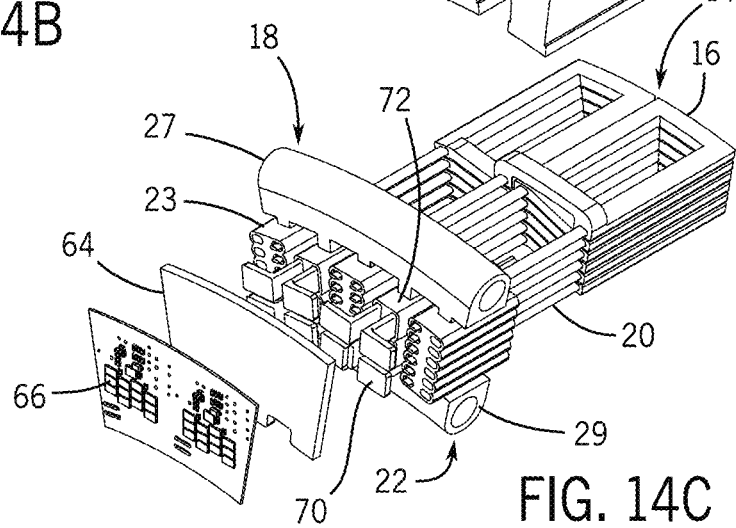

Referring now to FIG. 14A, a perspective view of an electrical machine 60 constructed with a stator of FIG. 1A is shown. As illustrated here a drive 62 is driven by the rotor 13. FIGS. 14B and 14C illustrate a perspective view and an exploded view, respectively, of a stator segment 61 for use in the machine of FIG. 14A. Referring specifically to FIG. 14C, the stator segment 61 includes windings 14 and heat pipes 20 as described with reference to FIG. 1C above. Here, the heat exchanger 68 is similar in construction to heat exchanger 22, described above, and includes a first set of winding cooling blocks 23 including apertures sized and dimensioned to receive the heat pipes 20 that cool the windings 14. A second set of power electronic cooling blocks 72 can be positioned, for example, between adjacent cooling blocks 23. The power electronic cooling blocks 72 include apertures that receive a second set of heat pipes 70, which are coupled to a heat sink 64 that is configured to mate with a printed circuit board 66 containing a circuit for driving the electrical machine 60. The heat sink 64 can be a plate constructed of an aluminum alloy. The heat pipes 70 can be constructed of metal alloys, such as aluminum alloys. A non-conductive coolant like ethylene glycol, deionized water, ethylene glycal, Mineral oil, organic-acid-based coolant can be used to provide galvanic isolation between the heat pipes 70.

Figure 16:
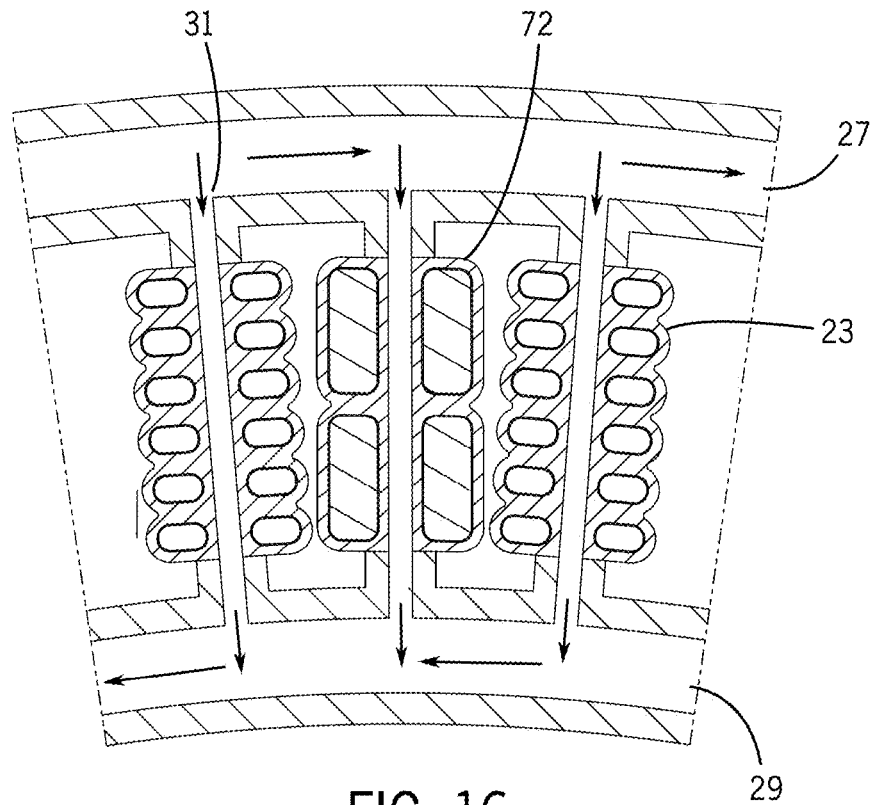
FIG. 16 is a cutaway view drawn along the line 16-16 of FIG. 14B.

Referring now also to FIG. 16, a cutaway view of the heat exchanger 68 is shown. As illustrated here, fluid received in the coolant pipe 27 travels through ducts 31 formed in the cooling blocks 23 and 72 and exits via coolant pipe 29. Similar ducts are provided in the heat exchanger 22 described above.

Figure 17:
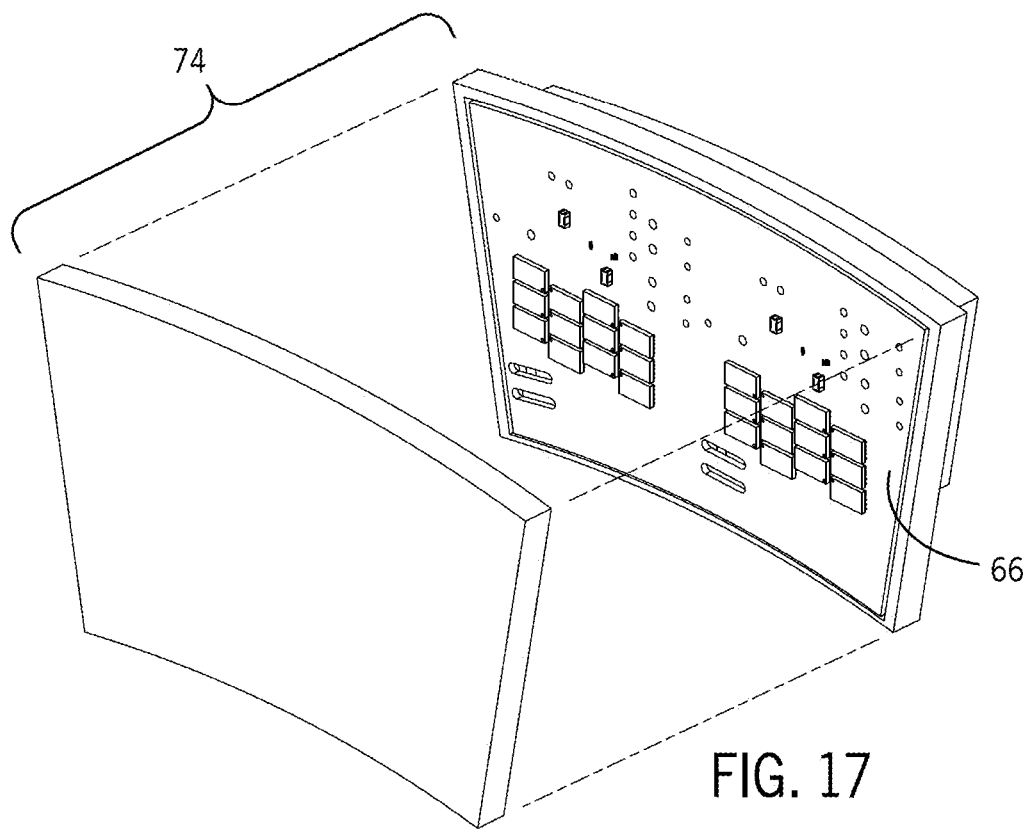
FIG. 17 is perspective view of the heat sink of FIG. 14C for thermal management of a printed circuit board connected to drive the machine.
Figure 18:
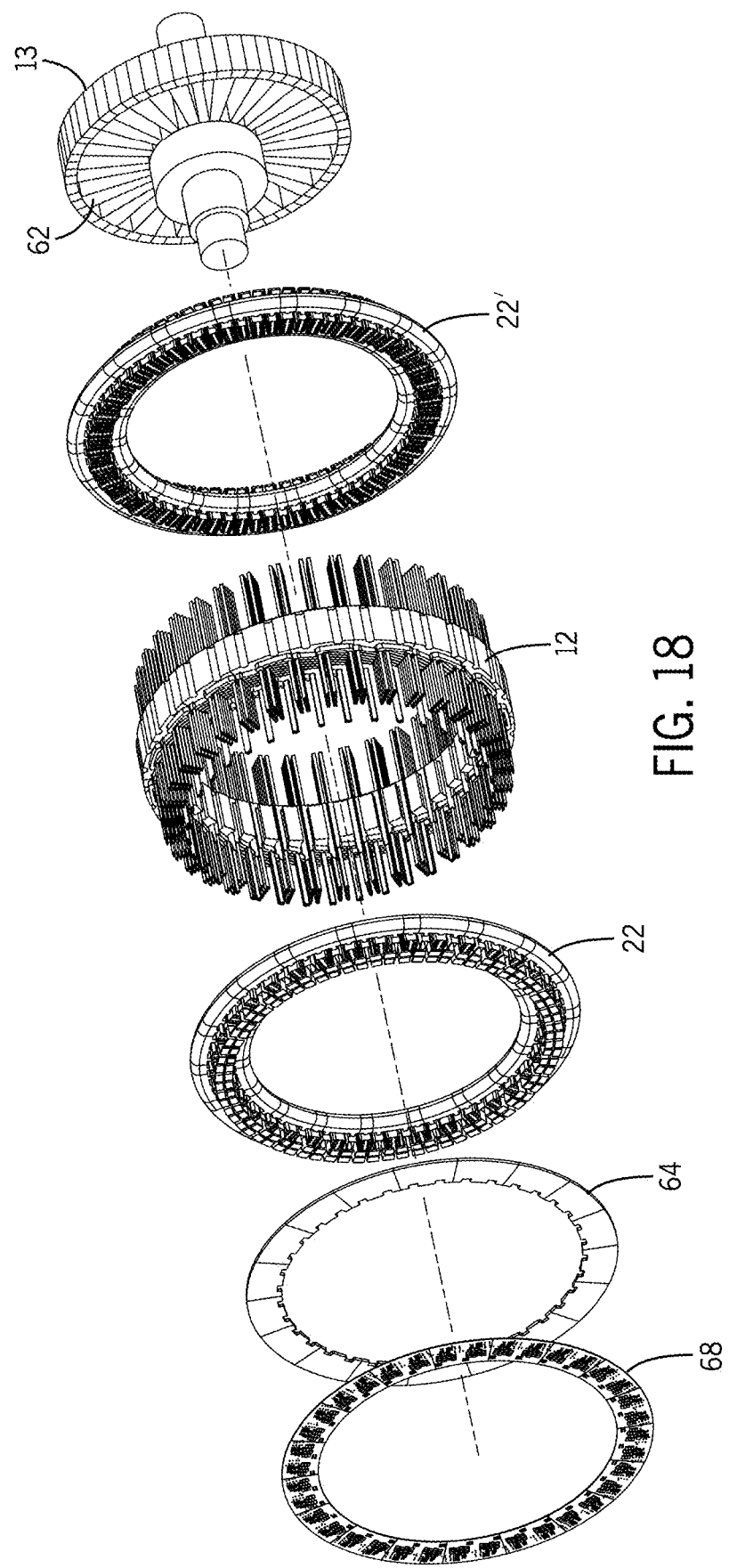
FIG. 18 is an exploded view of an electrical machine with windings cooled by two heat exchangers.

Referring now also to FIG. 17, the printed circuit board 66 can be encapsulated in a housing 74. The housing can be made of a metal alloy or thermal plastics including nylons and polymers and can be additively manufactured using fuse filament fabrication or laser sintering. Suitable metal alloys include aluminum alloy, which is light, inexpensive and has good thermal conductivity, copper, silver and gold. The circuit board 66 can also be submerged in silicon gel, silicone grease, or other silicone or non-silicone based thermal greases or "thermal pastes. The use of these materials to encase the circuit board can fill gaps around the circuit board 66 to reduce the risk of partial discharge. Further, because these materials have high thermal conductivity (up to 4.6 W/(m·K)) in comparison to air, the added materials can improve the heat dissipation between the circuit board 66 and the heat sink 64.

By integrating the circuits with the machine, and sharing thermal management with other components of the machine, overall size can be reduced. The design also enables minimizing cable length, and connections, which improves system efficiency and reduces electromagnetic interference.

Figure 15:
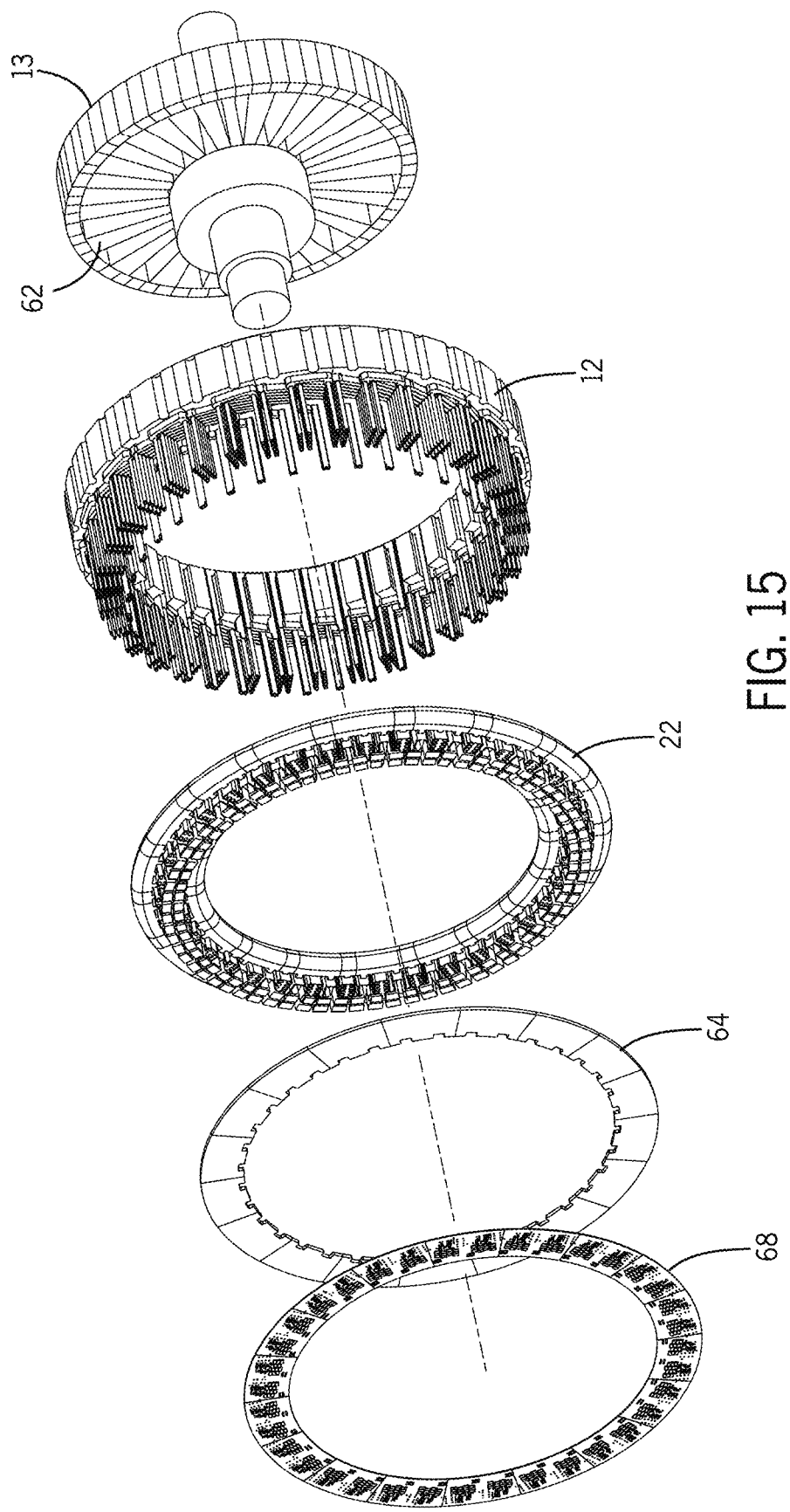
FIG. 15 is an exploded view of the electrical machine of FIG. 14A integrated with power electronics for driving the drive system.
Figure 19:
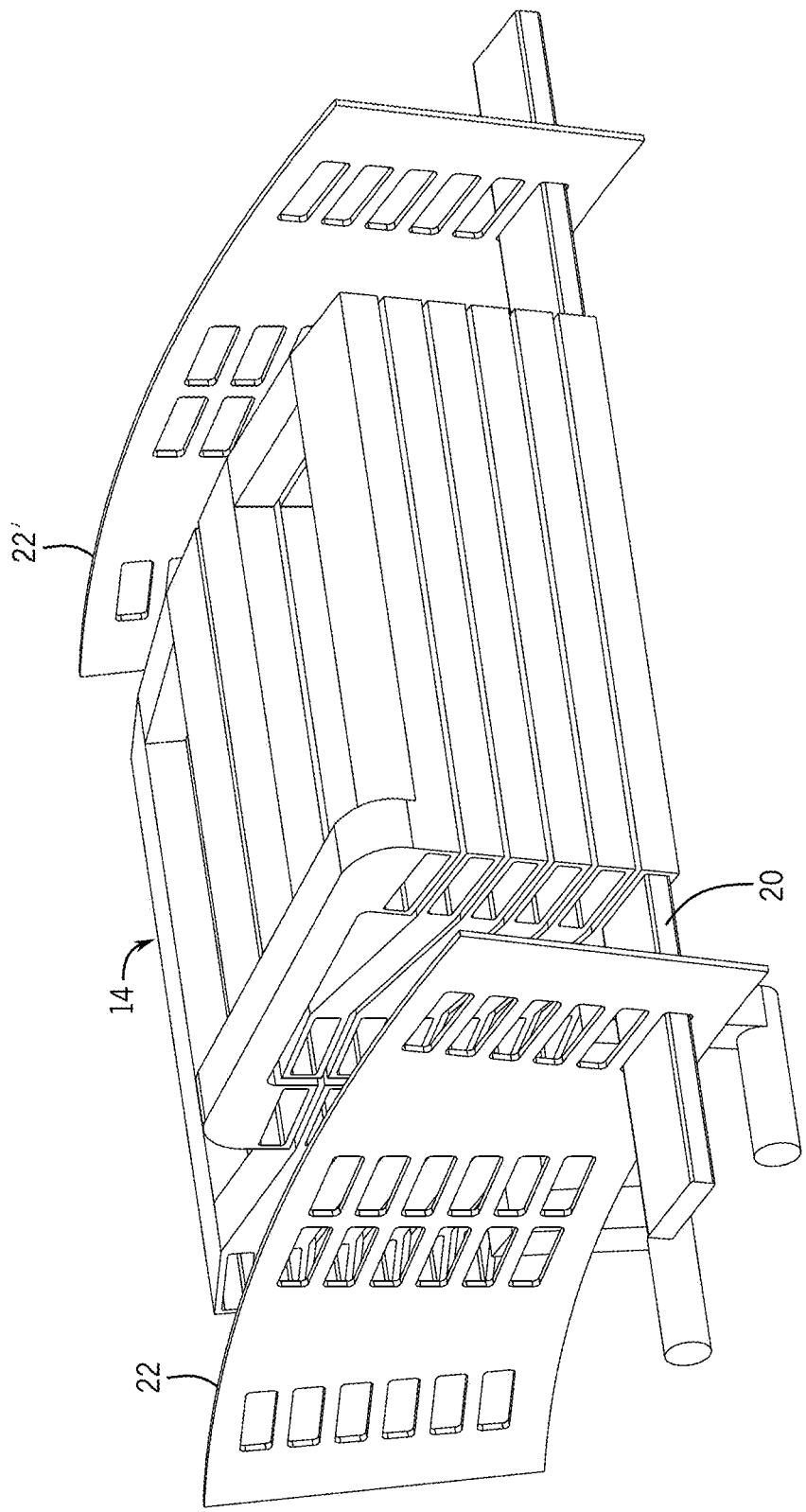
FIG. 19 is a perspective view of a winding of FIG. 18.
Figure 20:
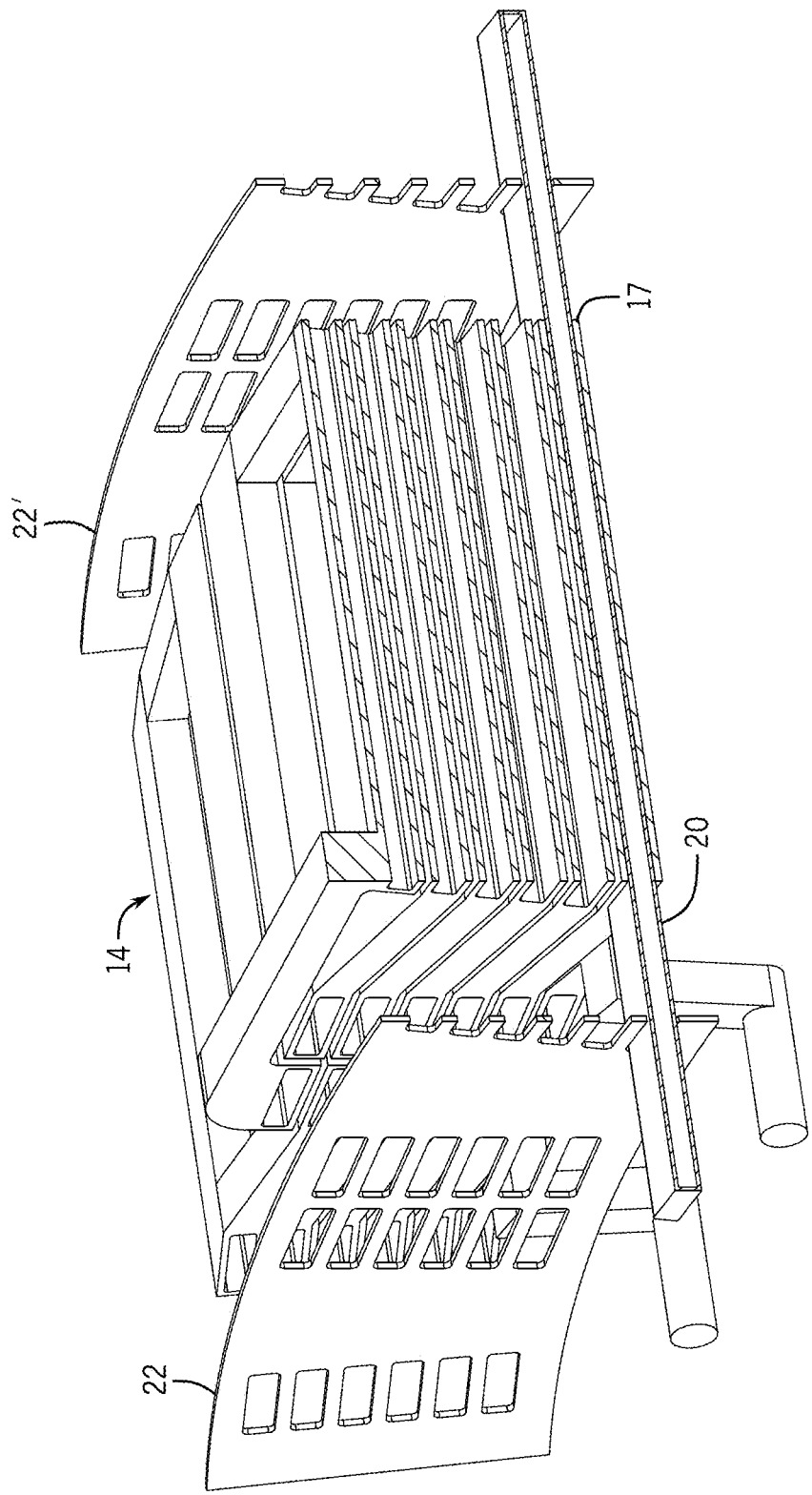
FIG. 20 is a cutaway view of the winding of FIG. 19 illustrating a single heat pipe configuration.
Figure 21:
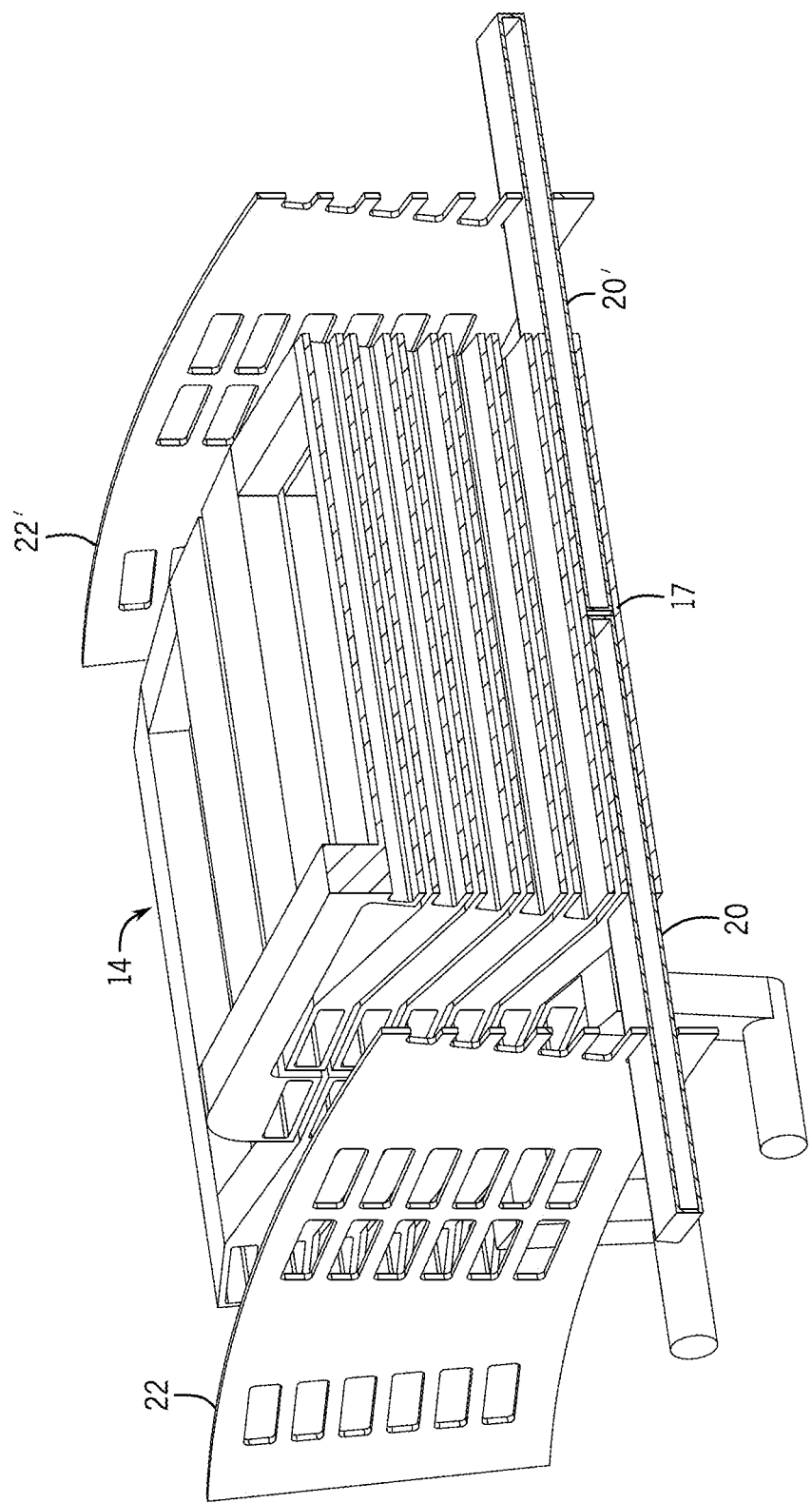
FIG. 21 is a cutaway view of the winding of FIG. 19 illustrating a dual heat pipe configuration, with back-to-back heat pipes.

Referring now to FIG. 19, an exploded view of a machine constructed similarly to that of FIG. 15 is shown. Here, however, the windings 14 are cooled by two heat exchangers, heat exchanger 20 and heat exchanger 20', which are positioned on opposite sides of the winding 14. A single heat pipe 20 can extend between the heat exchangers 22 and 22', as illustrated in FIG. 20. Alternatively, back-to-back heat pipes 20 and 20' can be extended into duct 17 of the winding 14, as illustrated in FIG. 21.

It should be understood that the methods and apparatuses described above are only exemplary and do not limit the scope of the invention, and that various modifications could be made by those skilled in the art that would fall under the scope of the invention. For example, although the conductors are illustrated in a rectangular configuration, other shaped can be used. In particular, polygons that occupy the slot area have been shown to be effective. In some applications, the conductors 16 have been described to include a duct. The duct can extend entirely through the side to render the side "hollow," but may in some applications also extend partially into the side. Here, for example a portion of the side conductor can also be solid. Further, although the end conductors have been described as solid, in some applications, ducts may also be provided in these portions of the winding.

Additionally, although specific AM techniques are described above to manufacture components of the stator, including the conductors and heat pipes, a number of different additive manufacturing techniques can be used. Additive manufacturing processes include, for example, processes often referred to as 3D printing or rapid prototyping. More specifically, these processes can include, for example, material extrusion, directed energy deposition, material jetting, binder jetting, sheet lamination, vat polymerization, and powder bed fusion. Additive manufacturing technologies include selective laser sintering/melting, selective laser beam melting, green wavelength laser melting, sintering, Direct Metal Laser Sintering (DMLS), Direct Metal Laser Melting (DMLM) and Electron Beam Melting (EBM), and Stereolithography (SLA). These processes can be applied using metals, ranging from precious metals like gold and silver to strategic metals like stainless steel and titanium, and also in thermoplastics, and ceramics.

Also, although $AlSi_{10}Mg$ is discussed above for constructing windings using additive manufacturing, other materials can be used depending on the applied process. For example, depending on the application, constructions using various pure copper, copper, and copper and aluminum alloys are possible, including $CuCr_1Zr$.

Other AM including filament extrusion process like fuse filament fabrication (FFF) and fused deposition modeling (FDM) can also be used. In these processes, the filament can be formed from material consisting of about 80%-90% metal alloy and about 10%-20% plastic material. After sintering (post processing), the final parts can be 100% metal alloy.

AM manufacturing can be performed by direct manufacturers including Stratasys Inc. of Los Angeles, CA; GKN Powder Metallurgy of Auburn Hills, MI; and Trumpf Group of Ditzigen, Germany; GE Additive of Cincinnati Ohio. AM manufactured parts can be directly constructed using a 3D printer. Appropriate equipment for producing parts of the type disclosed herein includes Arcam A2X made by GE Additive, which is suitable for Electron Beam Melting (EBM); SLM 500, SLM 125, SLM 800 produced by SLM Solutions of Germany, which are particularly suited for Direct Metal Laser Sintering; TruPrint 3000 produced by Trumpf Group, which is particularly suited for Green Laser Sintering/Melting; and the HP Metal Jet, produced by HP, Inc. of Palo Alto, CA, which is particularly suited for Fuse Filament Fabrication.

Additionally, although a construction which includes two component parts is described above, it will be apparent that the windings can be constructed of any number of individual parts connected together as described, or formed as a single component. Further, although constructions in which the end conductors are solid are described above, the end conductors may also be constructed as hollow, and to include ducts, in some applications.

Further, in the construction described above, the laminated core can be constructed of FeCo. However, various other constructions including soft magnetic materials like FeSi, NiFe, etc. can also be used. Further, although a tongue and groove connection between windings are illustrated, various other connection methods could be used, including but not limited to welding, bolt, junction box, etc. Additionally, a fractional-slot concentrated winding (FSCW) permanent magnet (PM) machine is described above. However, other winding distributions could also be constructed with these types of windings. To apprise the public of the scope of this invention, the following claims are made:

We claim:

1. A winding comprising:
   a first plurality of conductive leg members arranged in layers in a first stacked configuration, the layers including at least a top and a bottom layer; and
   a second plurality of conductive leg members arranged in layers in a second stacked configuration parallel to the first stacked configuration, the layers including at least a top and a bottom layer;
   wherein the leg member in the top layer of the stacked configuration of the first plurality of leg members is connected as follows:
   (i) at a first end to a leg member of the second plurality of leg members in a corresponding layer in the second stacked configuration; and
   (ii) at a second end to a leg member of the second plurality of leg members in an adjacent layer to the corresponding layer in the second stacked configuration; and
   (iii) successive layers of leg members in the first plurality are connected as defined in (i) and (ii) until a bottom layer is reached, such that at least one of the first and second ends of the leg member in the second plurality of leg members remains unconnected in the top layer and at least one of the first and second ends of the leg member in the first plurality of leg members remains unconnected at the bottom layer, forming a coil configured to be connected to a power supply; and
   wherein the connections between the first and second plurality of leg members are solid, and wherein at least one duct is formed extending through at least one of the first and second ends of at least one of the first and second plurality of leg members.

2. The winding of claim 1, wherein the at least one duct comprises a plurality of ducts, and at least one duct is formed in at least one of the first and second ends of each of the first plurality of leg members and each of the second plurality of leg members.

3. The winding of claim 2, wherein the plurality of ducts are formed to extend from the first end to the second end, wherein an opening is formed at each of the first and second ends of each of the first and second plurality of legs.

4. The winding of claim 1, wherein the duct is sized and dimensioned to receive a heat pipe.

5. The winding of claim 1, wherein the duct is sized and dimensioned for connection to a cooling fluid flow.

6. The winding of claim 1, wherein the at least one duct is formed in a side of the at least one leg to provide a semi-open duct.

7. The winding of claim 1, wherein the first and second plurality of legs are formed using additive manufacturing.

8. The winding of claim 7, wherein the first and second plurality of legs are formed using at least one of direct metal laser sintering, selective laser sintering/melting, selective laser beam melting, direct metal laser sintering, green wavelength laser melting, fuse filament fabrication and fused deposition modeling.

9. The winding of claim 7, wherein the first and second plurality of legs comprise at least one of copper, an aluminum alloy, $AlSi_{10}Mg$, and CuCr1Zr.

10. The winding of claim 1, wherein at least one of the legs in the first plurality of legs comprises a connecting element and at least one of the legs in the second plurality of legs comprises a mating connecting element, wherein the first plurality of legs and the second plurality of legs are configured to be selectively coupled together.

11. The winding of claim 10, wherein the at least one of the legs in the first plurality of legs comprising the connecting element is constructed to have a first electrical conductivity, and the at least one of the legs in the second plurality of legs comprising the mating connecting element is constructed to have a second electrical conductivity.

12. The winding of claim 1, wherein the first plurality of legs is coupled to the second plurality of legs through solid end elements.

13. The winding of claim 1, wherein the duct extends through the first and second ends of the at least one of the first and second plurality of leg members comprising the duct.

14. A stator, comprising:
   a plurality of open-slot iron core segments, the open-slot iron core segments being aligned in a side-by side configuration, wherein slots are formed between each pair of adjacent open-slot core segments;
   a plurality of windings according to claim 1, a corresponding one of each of the plurality of windings received in one of the slots formed between adjacent ones of the plurality of open-slot iron core segments.

15. The stator of claim 14, further comprising at least one heat pipe extending in the duct, the at least one heat pipe being configured to cool heat produced within the respective stator segment.

16. The stator of claim 14, further comprising a heat exchanger, the heat exchanger comprising at least one coolant pipe configured to provide coolant to the winding in the stator.

17. The stator of claim 16, wherein the heat exchanger is constructed using additive manufacturing.

18. The stator of claim 17, wherein the heat exchanger is constructed using fuse filament fabrication.

19. The stator of claim 17, wherein the heat exchanger comprises at least one of a thermoplastic, a nylon, and a metal.

20. The stator of claim 16, wherein stator comprises at least one heat pipe received in the duct, the heat exchanger includes at least one cooling block comprising apertures receiving an end of the heat pipe, and the at least one coolant pipe provides coolant flow to the cooling block.

* * * * *